US010572284B2

(12) United States Patent
Bugenhagen

(10) Patent No.: US 10,572,284 B2
(45) Date of Patent: *Feb. 25, 2020

(54) VIRTUALIZATION CONGESTION CONTROL FRAMEWORK FOR MODIFYING EXECUTION OF APPLICATIONS ON VIRTUAL MACHINE BASED ON MASS CONGESTION INDICATOR IN HOST COMPUTING SYSTEM

(71) Applicant: CenturyLink Intellectual Property LLC, Denver, CO (US)

(72) Inventor: Michael K. Bugenhagen, Leawood, KS (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/408,232

(22) Filed: Jan. 17, 2017

(65) Prior Publication Data

US 2017/0123839 A1 May 4, 2017

Related U.S. Application Data

(63) Continuation of application No. 14/805,196, filed on Jul. 21, 2015, now Pat. No. 9,582,305, which is a
(Continued)

(51) Int. Cl.
*G06F 9/455* (2018.01)
*G06F 9/50* (2006.01)

(52) U.S. Cl.
CPC ...... *G06F 9/45558* (2013.01); *G06F 9/45533* (2013.01); *G06F 9/50* (2013.01);
(Continued)

(58) Field of Classification Search
CPC .. G06F 9/45558; G06F 9/5016; G06F 9/5077; G06F 2009/45583; G06F 2009/45591
See application file for complete search history.

(56) References Cited

U.S. PATENT DOCUMENTS 6,427,150 B1  7/2002  Oashi
6,577,327 B1  6/2003  Rochford et al.
(Continued)

FOREIGN PATENT DOCUMENTS

EP   2017711 A2   1/2008
EP   2972859 A4   1/2016
(Continued)

OTHER PUBLICATIONS

Bohoris, Christos; "Network Performance Management Using Mobile Software Agents"; Jun. 2003; Centre for Communications Systems Research School of Electronics and Physical Sciences; University of Surrey, UK; 155 pages.
(Continued)

*Primary Examiner* — James J Lee

(57) ABSTRACT

Novel tools and techniques are provided for implementing a virtualization congestion control framework. In one aspect, a method might include a hypervisor assigning application resources of a virtual machine ("VM"), which operates on a host computing system, with maximum allowable settings to each software application to be executed on the VM. The hypervisor or an orchestrator might determine a running mode of the host computing system, and might execute the software application(s) using running mode attributes of the determined running mode. The hypervisor or the orchestrator might monitor application resource utilization, and, based on a determination that application resource utilization has changed, might modify allocation of application resources to each of the software application(s). In some cases, the hypervisor or the orchestrator might monitor for
(Continued)

mass congestion indicators, and, based on a determination that a mass congestion indicator is present, might modify the running mode of the host computing system.

20 Claims, 7 Drawing Sheets

Related U.S. Application Data continuation of application No. 14/061,147, filed on Oct. 23, 2013, now Pat. No. 9,141,416, which is a continuation-in-part of application No. 14/060,450, filed on Oct. 22, 2013, now Pat. No. 9,430,259.

(60) Provisional application No. 61/788,256, filed on Mar. 15, 2013.

(52) U.S. Cl.
CPC .......... *G06F 9/5016* (2013.01); *G06F 9/5077* (2013.01); *G06F 2009/45583* (2013.01); *G06F 2009/45591* (2013.01)

(56) References Cited

U.S. PATENT DOCUMENTS

| | | | |
|---|---|---|---|
| 7,664,115 B1 | 2/2010 | Robotham | |
| 7,672,923 B1 | 3/2010 | Reed | |
| 7,693,079 B2 | 4/2010 | Cerami et al. | |
| 8,051,382 B1 | 11/2011 | Kingdom et al. | |
| 8,103,480 B2 | 1/2012 | Korn et al. | |
| 8,223,655 B2 | 7/2012 | Heinz | |
| 8,462,632 B1* | 6/2013 | Vincent | H04L 47/30 370/235 |
| 8,717,895 B2 | 5/2014 | Koponen et al. | |
| 8,750,288 B2 | 6/2014 | Nakil et al. | |
| 8,755,377 B2 | 6/2014 | Nakil et al. | |
| 8,881,142 B1 | 11/2014 | Reid | |
| 8,953,441 B2 | 2/2015 | Nakil et al. | |
| 8,959,185 B2 | 2/2015 | Nakil et al. | |
| 9,098,214 B1 | 8/2015 | Vincent et al. | |
| 9,141,416 B2 | 9/2015 | Bugenhagen | |
| 9,158,565 B2 | 10/2015 | Jakoljevic et al. | |
| 9,185,170 B1 | 11/2015 | Grammel | |
| 9,231,892 B2 | 1/2016 | Baphna | |
| 9,250,863 B1 | 2/2016 | Vincent et al. | |
| 9,356,883 B1 | 5/2016 | Borthakur | |
| 9,430,259 B2 | 8/2016 | Bugenhagen | |
| 9,495,188 B1 | 11/2016 | Ettema et al. | |
| 9,582,305 B2 | 2/2017 | Bugenhagen | |
| 9,703,598 B2 | 7/2017 | Vincent et al. | |
| 2002/0152305 A1 | 10/2002 | Jackson et al. | |
| 2003/0055919 A1 | 3/2003 | Fong | |
| 2004/0015966 A1 | 1/2004 | Macchiano et al. | |
| 2005/0144288 A1 | 6/2005 | En-Yi | |
| 2005/0228921 A1 | 10/2005 | Sethi et al. | |
| 2007/0061433 A1 | 3/2007 | Reynolds | |
| 2007/0165818 A1 | 7/2007 | Savoor et al. | |
| 2007/0230358 A1 | 10/2007 | Narayanan et al. | |
| 2008/0002676 A1 | 1/2008 | Wiley | |
| 2008/0049639 A1 | 2/2008 | Wiley et al. | |
| 2008/0049927 A1 | 2/2008 | Wiley | |
| 2008/0052387 A1 | 2/2008 | Heinz et al. | |
| 2008/0155537 A1 | 6/2008 | Dinda et al. | |
| 2008/0259794 A1 | 10/2008 | Zou et al. | |
| 2009/0092151 A1 | 4/2009 | Raguet et al. | |
| 2009/0187654 A1 | 7/2009 | Raja et al. | |
| 2009/0204965 A1 | 8/2009 | Tanaka et al. | |
| 2009/0217267 A1 | 8/2009 | Gebhart | |
| 2009/0292858 A1 | 11/2009 | Lambeth et al. | |
| 2010/0023623 A1 | 1/2010 | Saffre et al. | |
| 2010/0100640 A1 | 4/2010 | Nakao | |
| 2010/0122334 A1 | 5/2010 | Stanzione et al. | |
| 2010/0162238 A1 | 6/2010 | Warfield | |
| 2010/0192152 A1* | 7/2010 | Miyamoto | G06F 9/485 718/102 |
| 2010/0217837 A1 | 8/2010 | Ansari | |
| 2010/0306763 A1 | 12/2010 | Lambert et al. | |
| 2011/0134930 A1 | 6/2011 | McLaren | |
| 2011/0209157 A1 | 8/2011 | Sumida et al. | |
| 2011/0222412 A1 | 9/2011 | Kompella | |
| 2011/0231551 A1* | 9/2011 | Hassan | H04L 12/1421 709/226 |
| 2011/0252418 A1 | 10/2011 | Havivi et al. | |
| 2011/0276951 A1 | 11/2011 | Jain | |
| 2011/0296234 A1 | 12/2011 | Oshins et al. | |
| 2011/0314469 A1 | 12/2011 | Qian Yi et al. | |
| 2012/0072909 A1 | 3/2012 | Bilal Malik et al. | |
| 2012/0089845 A1 | 4/2012 | Raleigh | |
| 2012/0151087 A1 | 6/2012 | Azam | |
| 2012/0151277 A1 | 6/2012 | Yu et al. | |
| 2012/0167083 A1 | 6/2012 | Suit | |
| 2012/0174099 A1 | 7/2012 | Ashok et al. | |
| 2012/0304175 A1 | 11/2012 | Damola et al. | |
| 2012/0307684 A1 | 12/2012 | Biswas et al. | |
| 2012/0331461 A1 | 12/2012 | Fries et al. | |
| 2013/0003538 A1* | 1/2013 | Greenberg | H04L 47/12 370/230 |
| 2013/0031543 A1* | 1/2013 | Angus | G06F 9/485 718/1 |
| 2013/0058215 A1 | 3/2013 | Koponen et al. | |
| 2013/0061297 A1 | 3/2013 | Larsen et al. | |
| 2013/0191850 A1 | 7/2013 | Fischer et al. | |
| 2013/0204971 A1 | 8/2013 | Brandwine et al. | |
| 2013/0212600 A1* | 8/2013 | Harsh | G06F 9/50 719/318 |
| 2013/0254424 A1 | 9/2013 | Guay et al. | |
| 2013/0275968 A1 | 10/2013 | Petev et al. | |
| 2013/0332926 A1 | 12/2013 | Jakoljevic et al. | |
| 2013/0343191 A1* | 12/2013 | Kim | H04L 47/11 370/235 |
| 2014/0012966 A1 | 1/2014 | Baphna | |
| 2014/0016924 A1 | 1/2014 | Gonzalez | |
| 2014/0123140 A1 | 5/2014 | Motoki | |
| 2014/0164618 A1 | 6/2014 | Alicherry et al. | |
| 2014/0201374 A1 | 7/2014 | Ashwood-Smith et al. | |
| 2014/0282528 A1 | 9/2014 | Bugenhagen | |
| 2014/0282529 A1 | 9/2014 | Bugenhagen | |
| 2014/0313984 A1 | 10/2014 | Diamond | |
| 2014/0321260 A1 | 10/2014 | Mishra et al. | |
| 2014/0347979 A1 | 11/2014 | Tanaka | |
| 2014/0359556 A1 | 12/2014 | Jujare et al. | |
| 2014/0372788 A1 | 12/2014 | Vavrick et al. | |
| 2015/0049601 A1 | 2/2015 | Bugenhagen | |
| 2015/0117454 A1 | 4/2015 | Koponen et al. | |
| 2015/0143368 A1 | 5/2015 | Bugenhagen | |
| 2015/0150020 A1 | 5/2015 | Duttagupta et al. | |
| 2015/0207699 A1 | 7/2015 | Fargano et al. | |
| 2015/0244617 A1 | 8/2015 | Nakil et al. | |
| 2015/0288541 A1 | 10/2015 | Fargano et al. | |
| 2015/0288622 A1 | 10/2015 | Fargano et al. | |
| 2015/0288767 A1 | 10/2015 | Fargano et al. | |
| 2015/0324220 A1 | 11/2015 | Bugenhagen | |
| 2015/0339156 A1 | 11/2015 | Vincent et al. | |
| 2015/0365281 A1 | 12/2015 | Marino | |
| 2016/0006696 A1 | 1/2016 | Donley et al. | |
| 2016/0048403 A1 | 2/2016 | Bugenhagen | |
| 2016/0050159 A1 | 2/2016 | Cook et al. | |
| 2016/0087859 A1 | 3/2016 | Kuan | |
| 2016/0197779 A1 | 7/2016 | Soejima | |
| 2016/0337206 A1 | 11/2016 | Bugenhagen et al. | |
| 2017/0093750 A1 | 3/2017 | McBride et al. | |
| 2017/0097834 A1 | 4/2017 | Cropper et al. | |
| 2017/0177396 A1 | 6/2017 | Palermo | |
| 2018/0150314 A1 | 1/2018 | Bugenhagen | |
| 2018/0123974 A1 | 5/2018 | McBride et al. | |
| 2018/0157515 A1 | 6/2018 | Malloy | |

(56) References Cited

U.S. PATENT DOCUMENTS

2018/0157523 A1 6/2018 Bugenhagen
2018/0159771 A1 6/2018 Malloy

FOREIGN PATENT DOCUMENTS

| KR | 10-2012-0060014 A | 6/2012 |
|---|---|---|
| KR | 2013-0093717 A | 8/2013 |
| KR | 10-1472013 B1 | 12/2014 |
| KR | 10-1475925 B1 | 12/2014 |
| KR | 20-140145645 A | 12/2014 |
| WO | WO-2014/110453 A1 | 7/2014 |
| WO | WO-2014/150715 A1 | 9/2014 |
| WO | WO-2015/077460 | 5/2015 |
| WO | WO-2015/126430 A1 | 8/2015 |
| WO | WO-2016/025497 | 2/2016 |
| WO | WO-2016/025501 | 2/2016 |
| WO | WO-2017/023396 A1 | 2/2017 |
| WO | WO-2017/058350 A1 | 4/2017 |
| WO | WO-2017/062344 A1 | 4/2017 |

OTHER PUBLICATIONS

U.S. Appl. No. 14/583,952; Non-Final Rejection dated May 31, 2017; 34 pages.
LightReading (Mar. 17, 2015). "RAD Launches vCPE Platform for Hosting VNFs." Web Site www.lightreading.com/nfv/nfv-elements/rad-launches-vcpe-platform-for-hosting-vnfs. Accessed Sep. 8, 2015, 1 page.
Gowan, Bo. (Jun. 22, 2015) "Ciena unveils a carrier-grade CPE for NFV." Web Site www.ciena.com/connect/blog/Ciena-unveils-a-carrier-grade-CPE-for-NFV.html. Accessed Sep. 8, 2015, 4 pages.
EP Patent App. No. 14768226.4; Supplementary European Search Report dated Nov. 29, 2016; 10 pages.
Henrik Basilier et al. Ericsson Review. Virtualizing network services—the telecom cloud, Mar. 28, 2014, Retrieved from the Internet: <http://www.ericsson.com/res/thecompany/docs/publications/ericssor_review/2014/er-telecom-cloud.pdf> ISSN 0014-0171, pp. 1-9.
International Application No. PCT/US2014/024050; International Preliminary Report on Patentability dated Sep. 24, 2015; 6 pages.
International Application No. PCT/US2014/024050; Published Application dated Sep. 25, 2014; 55 pages.
International Application No. PCT/US2014/066628; International Preliminary Report on Patentability dated Jun. 2, 2016; 7 pages.
International Application No. PCT/US2014/066628; Notification Concerning Availability of the Publication of the International Application dated May 28, 2015; 1 page.
International Application No. PCT/US2015/044682; International Search Report and Written Opinion dated Nov. 16, 2015; 13 pages.
International Application No. PCT/US2015/044690; International Search Report and Written Opinion dated Dec. 4, 2015; 12 pages.
International Application No. PCT/US2016/044882; International Search Report and Written Opinion dated Nov. 7, 2016; 11 pages.
International Search Report and Written Opinion prepared by the Korean Intellectual Property Office as International Searching Authority for PCT Intl Patent App. No. PCT/US2014/024050 dated Jun. 27, 2014; 9 pages.
International Search Report and Written Opinion prepared by the Korean Intellectual Property Office as International Searching Authority for PCT Intl Patent App. No. PCT/US2014/066628 dated Mar. 10, 2015; 10 pages.
International Search Report and Written Opinion prepared by the Korean Intellectual Property Office as International Searching Authority for PCT Intl Patent App. No. PCT/US2016/044867 dated Nov. 23, 2016; 13 pages.
International Search Report and Written Opinion prepared by the Korean Intellectual Property Office as International Searching Authority for PCT Intl Patent App. No. PCT/US2016/055293 dated Jan. 11, 2017; 12 pages.
Publication Notice of PCT Intl Patent App. No. PCT/US2014/024050 dated Sep. 25, 2014; 1 page.
Stuart Clayman et al. 'The Dynamic Placement of Virtual Network Functions.' In: 2014 IEEE Network Operations and Management Symposium (NOMS), May 5-9, 2014, pp. 1-9.
U.S. Appl. No. 14/060,450 ; Corrected Notice of Allowability dated Aug. 4, 2016; 33 pages.
U.S. Appl. No. 14/060,450; Final Rejection dated May 21, 2015; 20 pages.
U.S. Appl. No. 14/060,450; Non-Final Rejection dated Feb. 12, 2015; 33 pages.
U.S. Appl. No. 14/060,450; Notice of Allowance dated Mar. 30, 2016; 36 pages.
U.S. Appl. No. 14/061,147; Non-Final Rejection dated Dec. 19, 2014; 29 pages.
U.S. Appl. No. 14/061,147; Notice of Allowance and Interview Summary dated Apr. 29, 2015; 29 pages.
U.S. Appl. No. 14/460,085; Final Rejection dated Aug. 31, 2016; 31 pages.
U.S. Appl. No. 14/460,085; Non-Final Rejection dated Feb. 22, 2016; 28 pages.
U.S. Appl. No. 14/531,000; Final Rejection dated Dec. 15, 2016; 24 pages.
U.S. Appl. No. 14/531,000; Final Rejection dated May 2, 2016; 23 pages.
U.S. Appl. No. 14/531,000; Non-Final Rejection dated Jan. 29, 2016; 30 pages.
U.S. Appl. No. 14/531,000; Non-Final Rejection dated Mar. 31, 2017; 34 pages.
U.S. Appl. No. 14/531,000; Non-Final Rejection dated Aug. 26, 2016; 26 pages.
U.S. Appl. No. 14/583,952; Final Rejection dated Oct. 3, 2016; 34 pages.
U.S. Appl. No. 14/583,952; Non-Final Rejection dated Mar. 28, 2016; 32 pages.
U.S. Appl. No. 14/583,952; Notice of Panel Decision from Pre-Appeal Brief Review dated Feb. 23, 2017; 2 pgs.
U.S. Appl. No. 14/730,695; Non-Final Rejection dated Dec. 2, 2016; 27 pages.
U.S. Appl. No. 14/805,196; Notice of Allowability/Examiner Interview Summary dated Jan. 23, 2017; 25 pages.
U.S. Appl. No. 14/805,196; Notice of Allowance dated Oct. 14, 2016; 35 pages.
U.S. Appl. No. 14/983,884; Notice of Allowance dated Jul. 28, 2017; 30 pages.
U.S. Appl. No. 14/531,000; Notice of Allowance dated Aug. 31, 2017; 64 pages.
U.S. Appl. No. 14/583,952; Notice of Allowance dated Oct. 4, 2017; 41 pages.
U.S. Appl. No. 14/983,884; Notice of Allowance dated Oct. 23, 2017; 10 pages.
Kang et al, "Optimizing the 'One Big Switch': Abstraction in Software-Defined Networks", ACM, CoNEXT'13, Dec. 2013, pp. 13-24; <http://dl.acm.org/citation.cfm?id=2535373&CFIC=968133826&CFTOKEN=57638951>.
Vilalta et al., "Network Virtualization Controller for Abstraction and Control of Open-Flow-enabled Multi-tenant Multi-technology Transport Networks," IEEE, Jun. 2015, pp. 1-3; <http://ieeexplore.ieee.org/stamp/stamp.jsp?arnumber=7121738>.
Yu et al., "What SDN will Bring for Transport Networks?" Open Networking Summit 2014, Mar. 2014, pp. 1-2; <https://www.usenix.org/sites/default/files/ons2014-poster-yu.pdf>.
Extended European Search Report, dated Nov. 21, 2017, Application No. 14864171.5, 6 pages.
European Invitation to Rule 62a(1) EPC, dated Mar. 1, 2018, 3 pages.
European Examination Report, dated Mar. 15, 2018, 6 pages.
International Preliminary Report on Patentability, dated Apr. 10, 2018, 9 pages.

* cited by examiner though control state machines might utilize the orchestrator(s) and/or hypervisor(s) to add resources, such elements do not have the functionality for receiving limitations from the cloud to perform push backs to bound and/or reduce the use of hardware resources, and thus cannot ensure that if the application is attacked or running over capacity the application will not crash the system.

VIRTUALIZATION CONGESTION CONTROL FRAMEWORK FOR MODIFYING EXECUTION OF APPLICATIONS ON VIRTUAL MACHINE BASED ON MASS CONGESTION INDICATOR IN HOST COMPUTING SYSTEM

CROSS-REFERENCES TO RELATED APPLICATIONS

This application is a continuation of U.S. patent application Ser. No. 14/805,196 (the "'196 application"), filed Jul. 21, 201 by Michael K. Bugenhagen, entitled, "Virtualization Congestion Control Framework for Modifying Execution of Applications on Virtual Machine Based on Mass Congestion Indicator in Host Computing System," which is a continuation of U.S. patent application Ser. No. 14/061,147 (the "'147 application)" now U.S. Pat. No. 9,141,416), filed Oct. 23, 2013 by Michael K. Bugenhagen, entitled, "Virtualization Congestion Control Framework," which claims priority to U.S. Patent Application Ser. No. 61/788,256 (the "'256 application"), filed Mar. 15, 2013 by Michael K. Bugenhagen, entitled, "Virtualization Congestion Control Framework."

The '147 application is also a continuation-in-part of U.S. patent application Ser. No. 14/060,450 (the "'450 application;" now U.S. Pat. No. 9,430,259), filed Oct. 22, 2013 by Michael K. Bugenhagen, entitled, "Virtualization Congestion Control Framework," which also claims priority to the '256 application.

The entire disclosure of each of these applications is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and computer software for implementing a virtualization congestion control framework.

BACKGROUND

In a virtual machine ("VM") environment or cloud virtualized environment, such as in a telecommunications service provider system, congestion issues might arise where one or more applications might request more and more hardware resources, without end and without any means for monitoring the actual hardware (or hardware resource) constraints on the host system. Without any checks on the resource allocation associated with the host system, the one or more applications might request more and more hardware resources until the host system finally and catastrophically crashes.

Currently, existing application level congestion control state machines and push back interrupts are hardware specific to vendor platforms. In other words, even though existing application congestion controllers and congestion control state machines might utilize the orchestrator(s) and/or hypervisor(s) to add resources, such elements do not have the functionality for receiving limitations from the cloud to perform push backs to bound and/or reduce the use of hardware resources, and thus cannot ensure that if the application is attacked or running over capacity the application will not crash the system.

In addition, even though different hardware from a single vendor might provide for load push back mechanisms and/or dedicated scan rates at the north, south, east, and west bound interfaces of an application congestion controller, by using a protocol with an intelligent device for "buffer monitoring," such congestion control systems are vendor-specific and do not allow for cross-application congestion control that is required in a global VM environment. Moreover, interfaces in existing VMs are not designed to provide congestion control state inputs. Further, existing congestion control systems are typically one-way controls, without sufficient feedback.

As a result, the system can be vulnerable to system hacks, mass call events, or both, where the applications exhaust and consume resources without any limitation or any push back or throttle down application message especially in a mixed application environment from the orchestrator that manages the overall resources of the VM environment. Without such throttling, and load shedding mechanisms, the overall inability can render the system too busy to process normal traffic, and can result in the crushing of services and may cause the entire system network to crash.

Further, given that applications are mostly stateless and VM sessions can tolerate some small delay, congestion is only monitored at the CPU, memory, and storage levels (not interface), and additional resources are added when an application nears exhausting its allocated resources. The problem with this approach is that turning all communications into the same area with millions of users creates a "mass call event" (e.g., a "September 11" scenario) where use demand can exceed the resources across a cloud environment and exhaust all resources to the level of unacceptable non-performance. Normally, the physical limitations of dedicated hardware act as the threshold for the system triggering a load shedding survival mode. Once utilization approaches the limits of the equipment, non-critical processes are shed via the application congestion engines. Once an application is placed inside of a VM environment those limits are unknown, and can actually be dynamic available or unavailable. Therefore, to retain the application survivability, those utilization limits need to be communicated from the VM orchestrator to the application when congestion and resource limits have been reached.

Hence, there is a need for more robust and scalable virtualization congestion solutions.

BRIEF SUMMARY

Various embodiments provide techniques for implementing a virtualization congestion control framework. In particular, in an environment in which one or more virtual machines ("VMs") execute on a common hardware platform, a congestion control framework can coordinate resource utilization when being consumed by a plurality of applications (some of which might run within the same VM or different VMs on the same hardware platform). While conventional VM hypervisors provide some resource allocation features, congestion control framework provided by various embodiments can enable substantial additional functionality and control. In an aspect, therefore, the congestion control framework can provide better visibility to a running application about the system's impact on the underlying hardware platform, as well as the impact of other running applications (either in the same VM or in another VM on the same hardware). Further, the framework can allow the application to communicate its own needs to the hypervisor via an orchestrator.

In various embodiments, an orchestrator might be provided within a virtual machine environment context in order to provide two-way communications between the virtual machine ("VM") and one or more applications running in the VM environment in order to communicate host control congestion states of hardware resource usage. In some cases, the two-way communications might be established using a congestion application programming interface ("API"). In some embodiments, the two-way communications might include communications from the VM to the one or more applications including maximum hardware resources and current hardware resources, and might further include communications from the one or more applications and/or operating systems to the VM including pre-congestion notifications and low-utilization notifications. According to some embodiments, a VM resource buffer utilization feedback may be provided between the VM and the one or more applications. The buffer utilization feedback might allow the orchestrator and/or applications to control pushback mechanisms, while the pushback mechanisms might include mechanisms for pushing back on or decreasing service levels or rates, and pushing back on or decreasing hardware resource usage.

In some embodiments, the virtualized application congestion control framework might be a distributed congestion control framework that separates components of the application congestion state machine into the virtual machine layers and distributes the different portions of state machines to specialized VM environment systems so that the application congestion control will function in a VM environment with a VM level congestion control engine.

According to some embodiments, various application interfaces, congestion tracking mechanisms, and pushback mechanisms must be distributed in a particular framework (such as described in detail below) to enable the VM environment and the one or more applications to work together to perform congestion management.

To ensure the reliability of the communication system, the system needs to pre-assess what amount of resources it can ultimately assign or ration to which applications during an emergency event. In addition, some "operational" overhead or spare buffer resource needs to be allocated to ensure that if a change is required to take place, the resources required to make those adjustments are available.

According to some embodiments, after assigning application resources of a VM with maximum allowable settings to each VM or software application to be executed on the VM, a hypervisor might execute the software application(s) using attributes of a determined running mode of the host computing system, on which the VM is operating. The hypervisor or an orchestrator might continually monitor application resource usage within the host computing system, and might modify allocation of application resources to each software application based on a determination that resource usage has changed. Modifying allocation of resources might, in some cases, mean increasing resource allocation to some software applications, decreasing resource allocation to other software applications, or both. In some instances, the hypervisor or orchestrator might monitor the host computer system or the network for mass congestion or mass event indicators. The Orchestrator and Hypervisor might contain a set of congestion utilization limits to ration out resources to the different applications and/or VMs. If determined to be present, the mass congestion or mass event indicators might cause the hypervisor or the orchestrator to modify the running mode of the host computing system. As a result, the software application(s) might be executed using attributes of the modified running mode.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In one aspect, a system might be provided for implementing a virtualization congestion control framework. The system might comprise a host system connected to a service provider network. The host system might comprise one or more processors, one or more hardware components, and a non-transitory computer readable medium having encoded thereon a set of instructions executable by the one or more processors to perform one or more operations.

In some cases, the set of instructions might comprise instructions for establishing a virtual machine environment, instructions for running an application congestion controller within the virtual machine environment, and instructions for establishing one or more interfaces mapping the virtual machine environment with the one or more hardware components of the host system.

In some embodiments, the set of instructions might further comprise instructions for establishing a resource usage state module running within the virtual machine environment, and instructions for monitoring, with the resource usage state module, hardware resource usage of the one or more hardware components.

The set of instructions, according to some examples, might also comprise instructions for establishing an orchestrator operatively coupled to the application congestion controller and to the resource usage state module, instructions for controlling, with the orchestrator, congestion of hardware resources used by one or more applications running on one or more virtual machines in the virtual machine environment, instructions for establishing, with the orchestrator, two-way communications between the virtual machine environment and the one or more applications running on the one or more virtual machines, and instructions for modifying, with the orchestrator, an allocation of hardware resources to the one or more applications.

In another aspect, a system might be provided for implementing a virtualization congestion control framework. The system might comprise a host system connected to a service provider network. The host system might comprise one or more processors, one or more hardware components, and a non-transitory computer readable medium having encoded thereon a set of instructions executable by the one or more processors to perform one or more operations.

In some embodiments, the set of instructions might comprise instructions for establishing, with an orchestrator, two-way communications between a virtual machine environment established within the host computer system and one or more applications running on one or more virtual machines in the virtual machine environment. The set of instructions might further comprise instructions for modifying, with the orchestrator, an allocation of hardware resources of the one or more hardware components to the one or more applications, based on the two-way communication between the virtual machine environment and the one or more applications.

In some cases, the set of instructions might include instructions for recovering, with the orchestrator, hardware resources from a first application, in response to receiving a notification indicating low utilization of hardware resources by the first application.

According to some embodiments, the set of instructions might include instructions for monitoring, with the orchestrator, the hardware resource usage for mass congestion indicators. In some cases, the set of instructions might further include instructions for determining, with the orchestrator, whether mass congestion indicators are present, and for, in response to a determination that mass congestion indicators are present, modifying, with the orchestrator, hardware resource allocations downward to reflect congestion control. In some embodiments, modifying, with the orchestrator, hardware resource allocations downward to reflect congestion control might include sending, with the orchestrator, signals to at least one of the one or more applications to begin load shedding. In some instances, modifying, with the orchestrator, hardware resource allocations downward to reflect congestion control might include adjusting, with the orchestrator, to pre-set congestion boundaries by causing a forced load shedding of at least one of the one or more applications.

In yet another aspect, a method might be provided for implementing a virtualization congestion control framework. The method might comprise establishing, with an orchestrator on a host computer system, two-way communications between a virtual machine environment established within the host computer system and one or more applications running on one or more virtual machines in the virtual machine environment. The method might further comprise modifying, with the orchestrator, an allocation of hardware resources of the one or more hardware components to the one or more applications, based on the two-way communication between the virtual machine environment and the one or more applications.

In still another aspect, a computer software might be provided that might be encoded on a non-transitory computer readable medium of a host system. The computer software might comprise a set of instructions executable by one or more processors of the host system to perform one or more operations. The set of instructions might comprise instructions for establishing, with an orchestrator on the host computer system, two-way communications between a virtual machine established within the host computer system and one or more applications running on one or more virtual machines in the virtual machine environment. The set of instructions might further comprise instructions for modifying, with the orchestrator, an allocation of hardware resources of the one or more hardware components to the one or more applications, based on the two-way communication between the virtual machine environment and the one or more applications.

In an aspect, a method might be provided for implementing a virtualization congestion control framework within a host computing system. The method might comprise assigning, with a hypervisor, application resources of a virtual machine ("VM"), which is operating on the host computing system, with maximum allowable settings to each of one or more software applications to be executed on the VM. The method might further comprise determining, with one of the hypervisor or an orchestrator, a running mode of the host computing system, and executing, with the hypervisor, the one or more software applications on the VM using running mode attributes of the determined running mode of the host computing system. The method might also comprise monitoring, with one of the hypervisor or an operating system running within the VM, application resource utilization of the host computing system, and, based on a determination that application resource utilization has changed, modifying, with one of the hypervisor or the orchestrator, allocation of application resources of the VM to each of the one or more software applications. In this manner, the host hypervisor and/or orchestrator can request the operating system and/or application in the VM to lower its resource utilization, such that the application can gracefully shed resources instead of experiencing a drastic system resource reduction which would impact live customer services.

In some cases, the running mode might be selected from a group consisting of a normal (or non-congested) running mode ("L0 mode"), a first level crisis mode ("L1 mode"), a second level crisis mode ("L2 mode"), and a third level crisis mode ("L3 mode"). The second level crisis mode might define a smaller minimum resource allocation level compared with the first level crisis mode, while the third level crisis mode might define a smaller minimum resource allocation level compared with the second level crisis mode. In some embodiments, each of the first through third level crisis modes might further define predetermined running mode attributes. For example, the predetermined running mode attributes of the L1 mode might include dumping non-essential software applications, the predetermined running mode attributes of the L2 mode might include staging workload reductions of remaining software applications, and the predetermined running mode attributes of the L3 mode might include slowing processing of the remaining software applications.

In some instances, the method might further comprise monitoring, with one of the hypervisor or the orchestrator, the host computing system and one or more networks, through which the host computing system is communicatively coupled to other computer systems, for presence of mass congestion indicators. Based on a determination that at least one mass congestion indicator is present, the method might comprise modifying, with one of the hypervisor or the orchestrator, the running mode of the host computing system, and executing, with the hypervisor, the one or more software applications on the VM using running mode attributes of the modified running mode of the host computing system.

According to some examples, modifying, with one of the hypervisor or the orchestrator, allocation of application resources of the VM to each of the one or more software applications, based on a determination that application resource utilization has changed, might comprise performing at least one of increasing, with one of the hypervisor or the orchestrator, allocation of application resources of the VM to a first set of the one or more software applications or decreasing, with one of the hypervisor or the orchestrator, allocation of application resources of the VM to a second set of the one or more software applications, based on a determination that application resource utilization is approaching maximum resource use.

In another aspect, a system might be provided for implementing a virtualization congestion control framework. The system might comprise a host computing system connected to a service provider network. The host computing system might comprise one or more processors, one or more hardware components, and a non-transitory computer readable medium having encoded thereon a set of instructions that, when executed by the one or more processors, causes the one or more hardware components to perform one or more operations. The set of instructions might comprise instructions to assign application resources of a virtual machine ("VM"), which is operating on the host computing system, with maximum allowable settings to each of one or more software applications to be executed on the VM. The set of instructions might further comprise instructions to determine a running mode of the host computing system and instructions to execute the one or more software applications on the VM using running mode attributes of the determined running mode of the host computing system. The set of instructions might also comprise instructions to monitor application resource utilization of the host computing system and instructions to, based on a determination that application resource utilization has changed, modify allocation of application resources of the VM to each of the one or more software applications.

In yet another aspect, an apparatus might be provided that comprises a non-transitory computer readable medium having encoded thereon software for controlling operation of a host computing system. The software might comprise a set of instructions that, when executed by one or more processors of the host computing system, causes the host computing system to perform one or more operations. The set of instructions might comprise instructions to assign application resources of a virtual machine ("VM"), which is operating on the host computing system, with maximum allowable settings to each of one or more software applications to be executed on the VM. The set of instructions might further comprise instructions to determine a running mode of the host computing system and instructions to execute the one or more software applications on the VM using running mode attributes of the determined running mode of the host computing system. The set of instructions might also comprise instructions to monitor application resource utilization of the host computing system and instructions to, based on a determination that application resource utilization has changed, modify allocation of application resources of the VM to each of the one or more software applications.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
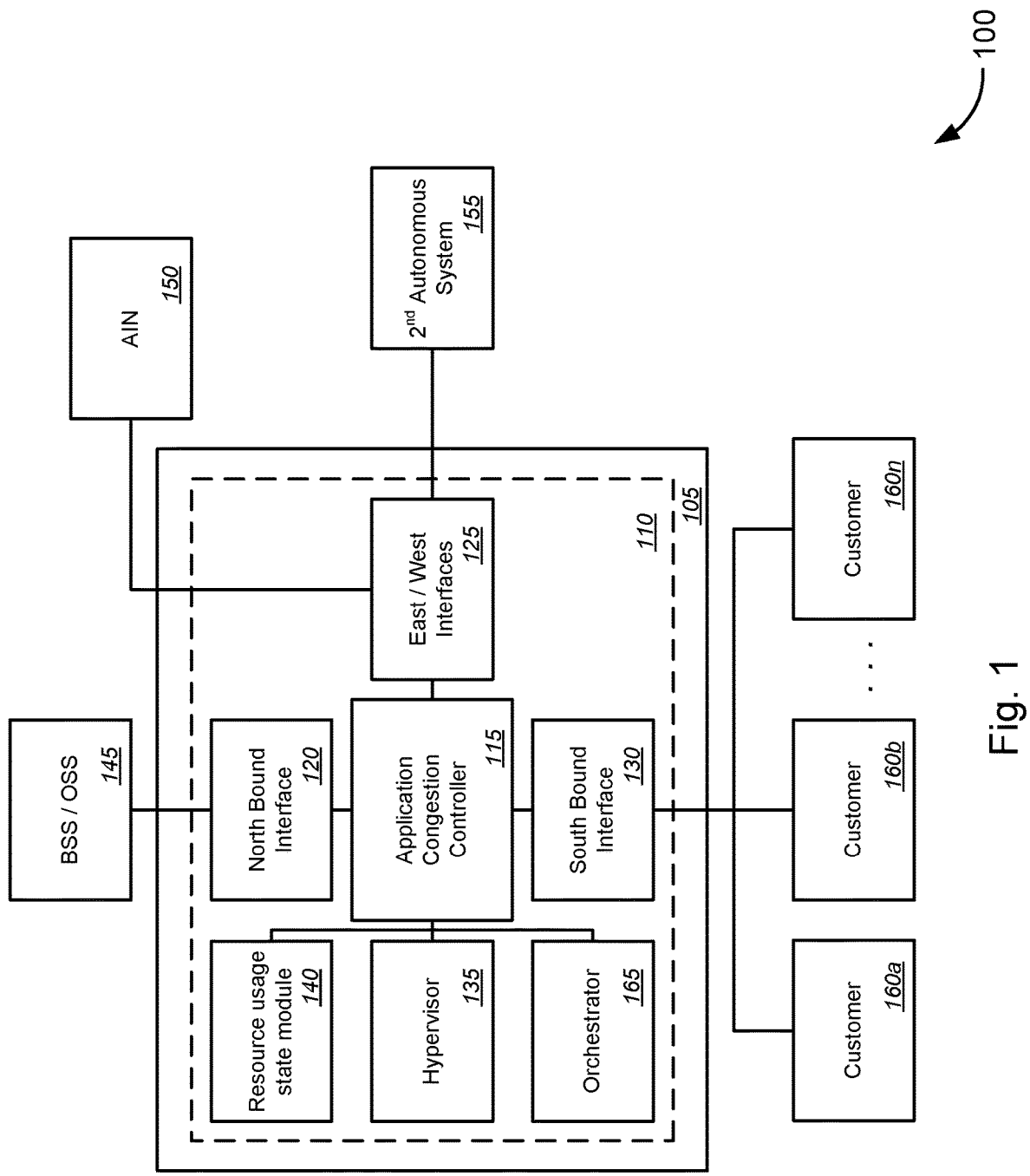
FIG. 1 is a block diagram illustrating a system for controlling virtualization congestion, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide techniques for implementing a virtualization congestion control framework.

Currently, service providers in the industry would like to make their virtual machine ("VM") systems more dynamic, from cell phone to large cloud applications. The service providers want to automatically deploy and start running virtual templates (e.g., VM, operating system, and applications) all at one time. The issue, however, is that all currently available commercial VM platforms can add resources to VMs and operating systems dynamically without stopping them, but are incapable of allocating them automatically due to a lack of an automated resource call admission control ("CaC"). An automated resource CaC must be able to track all available resources, track all active and reserved resource usage, and perform "checks" or admission control for allowing new use of resources. Assigning this functional process to a VM environment is difficult to implement because each VM with an operating system, as well as software applications running in it, has multiple levels of resource use, and they are flexible to some extent with compressible resource use. In some embodiments, prior to enabling a host computing system to dynamically add or subtract memory and central processing unit ("CPU") cycles to a software application, new state machines might be added for congestion control (i.e., as a push back to inform the operating system in a machine to lower its use, and as a new "congestion mode" state to the host computing system so that it can pre-emptively handle reacting to mass events in a graceful manner), which enables management and allocation of resource through the multiple levels of resource use, while also allowing control of compressible resource use.

According to some embodiments, after assigning application resources of a virtual machine ("VM") with maximum allowable settings to each VM or software application to be executed on the VM, a hypervisor might execute the software application(s) using attributes of a determined running mode of a host computing system, on which the VM is operating. The attributes might include, without limitation, dumping non-essential software applications (for an L1 crisis mode), staging workload reductions of remaining software applications (for an L2 crisis mode), or slowing processing of the remaining software applications (for an L3 crisis mode). The hypervisor or an orchestrator might continually monitor application resource usage within the host computing system, and might modify allocation of application resources to each software application based on a determination that resource usage has changed. Modifying allocation of resources might, in some cases, mean increasing resource allocation to some software applications, decreasing resource allocation to other software applications, or both. In some instances, the hypervisor or orchestrator might monitor the host computer system or the network for mass congestion or mass event indicators (including, but not limited to, a predetermined trigger or utilization or performance threshold level of resource usage being exceeded, or a determination that an emergency reserve that is set aside out of the available resources begins to be used, or the like). The Orchestrator and Hypervisor might contain a set of congestion utilization limits to ration out resources to the different applications and/or VMs. If determined to be present, the mass congestion or mass event indicators might cause the hypervisor or the orchestrator to modify the running mode of the host computing system. As a result, the software application(s) might be executed using attributes of the modified running mode.

In some embodiments, in an environment in which one or more VMs execute on a common hardware platform, a congestion control framework can coordinate resource utilization by a plurality of applications (some of which might run within the same VM or different VMs on the same hardware platform). While conventional VM hypervisors provide some resource allocation features, congestion control framework provided by various embodiments can enable substantial additional functionality and control. Merely by way of example, in particular aspects, the framework can provide a congestion controller that can allocate resources to, and/or withdraw resources from, an application dynamically. In some cases, the congestion controller can allocate resources to (and/or withdraw resources from) an application in a different manner when the system is under stress, than when in normal operating conditions. In another aspect, the controller (and/or an orchestrator component) might provide two-way communication between the application and the underlying hardware platform, converse to the abstraction typically provided by a hypervisor. This two-way communication can better enable an application to request additional resources (and/or determine whether such resources are available for request) and/or notify the system that resources can be withdrawn.

In an aspect, therefore, the congestion control framework can provide better system state visibility on a running application's impact on the underlying hardware platform, as well as the impact of other running applications (either in the same VM or in another VM on the same hardware). Further, the framework can allow the application and operating systems to communicate its own needs to the hypervisor. These features can allow, for example, the orchestrator to forcefully withdraw resources from an application. In some cases, pushback or throttle down functionality is provided for forcefully withdrawing resources. In some instances, the orchestrator forcefully withdrawing resources from an application might include the orchestrator requesting that the application load shed and dynamically reduce its workload and/or resource utilization (which might be measured in clients serviced, transactions per second, input/output ("I/O") operations, network utilization, processor utilization, and/or any other metric) to prevent system overload, avoid performance degradation (and/or catastrophic failure) of that application or other applications, and the like. By the same token, however, the framework, in some embodiments, can also allow an application to inform the orchestrator that it needs more resources (or will need more resources in the future) to accommodate increasing load. Thus, various embodiments enable enhanced negotiation between an application and an orchestrator (and/or the underlying hardware) with respect to resource utilization. In an aspect of other embodiments, this framework can also provide an application with the ability to control the load imposed on that application by external entities (which might be peer servers, upstream load controllers, and/or downstream clients).

Herein, the term "congestion" might refer to one or more applications utilizing sufficient hardware resources of the hardware interface that at least one of the one or more applications becomes negatively impacted. The term "running over capacity" might refer to one or more applications using more than the available hardware resources, such as to contribute to congestion. The term "crash" might refer to a catastrophic failure of the network or system, which might result from one or more applications "running over capacity" and/or being attacked. "Pushback" might refer to a reduction in the use of hardware resources, typically as a result of notification of congestion, running at or over capacity, or eminent crash.

A "hypervisor" might be a virtual machine manager ("VMM"), which might be a component of computer software, firmware, and/or hardware that creates and runs virtual machines. The "hypervisor" might run one or more VMs on a computer defined as a "host machine," and each of the one or more VMs might be defined as a "guest machine." In operation, the "hypervisor" might provide the "guest machines" or operating systems of the "guest machines" with a virtual operating platform, and might manage the execution of the "guest machine" operating systems.

The term "business support system" ("BSS") might refer to components that a service provider (such as a telephone operator or telecommunications company) might use to run its business operations, including, for example, taking orders, handling payment issues, or dealing with revenues, and the like. BSS might generally cover the four main areas of product management, customer management, revenue management, and order management. In a related manner, the term "operations support system" ("OSS") might refer to components used by telecommunications service providers to deal with the telecommunications network itself, supporting processes including, but not limited to, maintaining network inventory, provisioning services, configuring network components, managing faults, and the like. The two systems functioning together might be referred to as "BSS/OSS."

An "advanced intelligent network" ("AIN") might refer to any telephone network that queries a database before a telephone call is sent to its final destination in order to determine how to handle or route the call. A typical AIN might provide the following two main functionalities: (1) the AIN might be able to affect or change the routing of calls within it from moment to moment, based on some criteria; and (2) the AIN might allow the originator or the ultimate receiver of the call to somehow inject intelligence into the network to affect the flow of the outbound or inbound call. Typically, AINs might comprise signal control points ("SCPs"), signal switching points ("SSPs"), and signal transfer points ("STPs"), all of which might communicate via out-of-band signaling, using, for example, signaling system 7 ("SS7") protocol. SCPs are typically computers that hold databases in which customer-specific information used by the network for routing calls might be stored. SSPs are typically digital telephone switches that communicate with SCPs to request for customer-specific instructions pertaining to call completion. STPs are typically packet switches that shuttle messages between SSPs and SCPs.

An "application programming interface" ("API") might refer to a protocol intended to be used as an interface by software components to communicate with each other.

"Virtualization" might refer to a process of mapping hardware resources to create "virtual machine resource" within the framework of the VMs so that the VM environment may utilize the hardware resources. For example, each of the north, south, east, and west interfaces shown in FIGS. 1 and 2 are parts of physical and/or virtual links that have been apportioned or "virtualized" to an application as a port to the application, which might be associated with various external components (i.e., BSS/OSS, AIN, second autonomous systems, customers, and the like) via the hardware or host system on which the VM is running.

We now turn to the embodiments as illustrated by the drawings. FIGS. 1-7 illustrate some of the features of the method, system, and apparatus for implementing virtualization congestion control and implementing hardware resource allocation and management, as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

Figure 2:
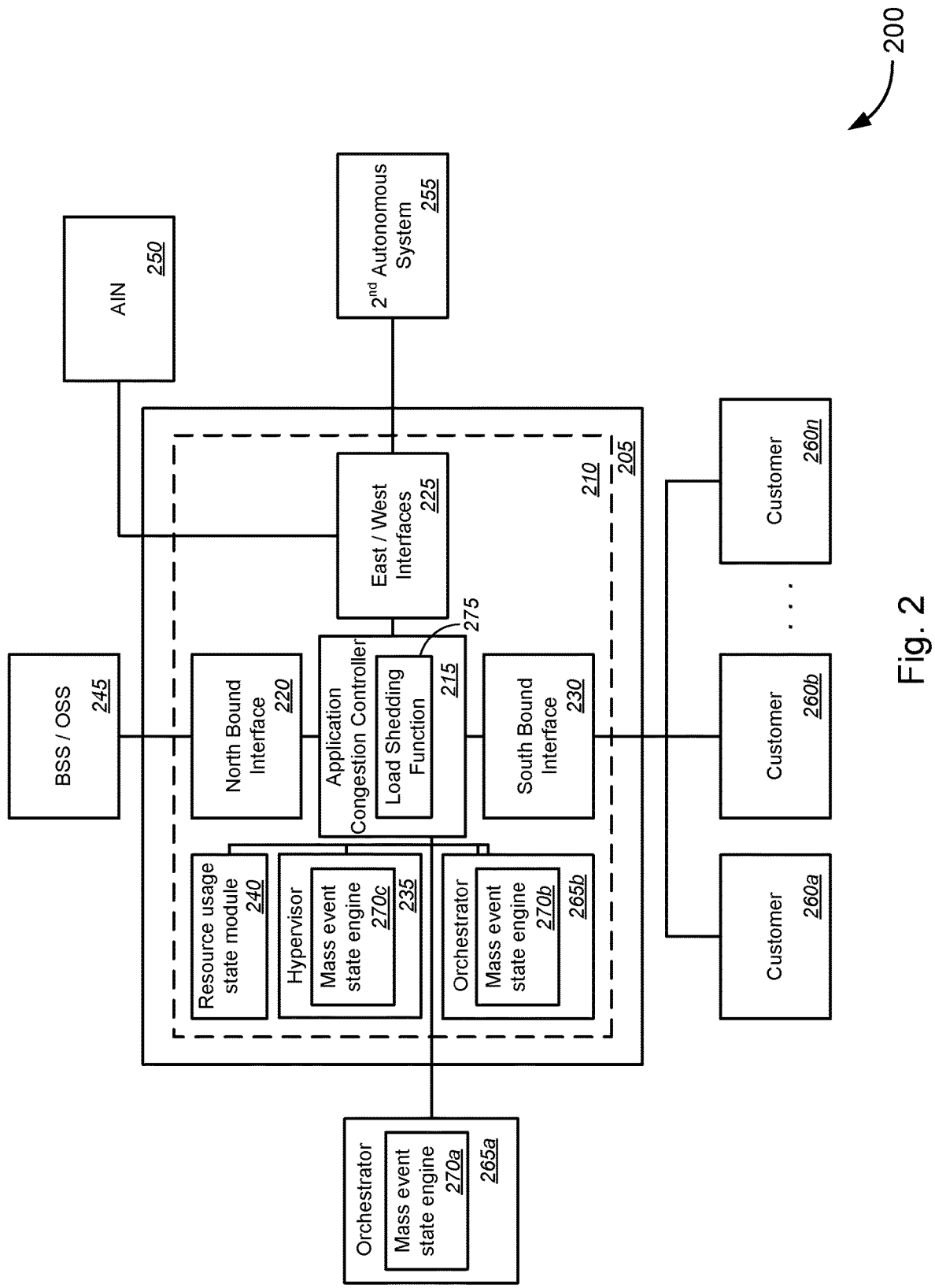
FIG. 2 is a block diagram illustrating an exemplary system for controlling virtualization congestion, in accordance with various embodiments.

With reference to the figures, FIG. 1 is a block diagram illustrating a system 100 for controlling virtualization congestion, in accordance with various embodiments. In system 100 as shown in FIG. 1, computer or hardware system 105 might serve as a host machine or host system that creates and operates a virtual environment (or virtual machine environment) 110, in which an application congestion controller 115 (also referred to herein as an "application controller" or a "congestion engine") might run. The application congestion controller 115 might be operatively coupled to a number of interfaces or components, including, but not limited to, a north or north bound interface 120, east/west interfaces 125, south or south bound interface 130, a hypervisor 135, a resource usage state module 140, and an orchestrator 165, all of which might be executed within the virtual environment 110.

System 100 might further comprise a BSS/OSS 145, an AIN 150, one or more second autonomous systems 155, and one or more customers 160. In some embodiments, second autonomous systems 155 might include a computer or hardware system that might be similar to, identical to, or different from computer or hardware system 105. The one or more customers 160 might include customers 160a, 160b, through 160n. Each of customers 160a, 160b, through 160n might comprise a customer device including, but not limited to, POTS telephones, voice over Internet protocol ("VoIP") telephones, cellular telephones, smart phones, tablet computers, laptop computers, desktop computers, or the like.

Computer or hardware system 105 and the second autonomous systems 155 might be located in another service provider network, or might be physically different systems not inside the VM environment but still in the service provider facilities or premises, and might be associated with one or more of VoIP switches, Internet protocol television ("IPTV") servers, content delivery networks ("CDNs"), Internet servers, other network servers, and the like. In some cases, the computer or hardware system 105 and/or the second autonomous systems 155 might comprise one or more of VoIP servers or switches, IPTV servers, content servers (in a CDN), Internet servers, SS7 nodes, and/or other AIN elements, other network servers, and the like. In a particular aspect, such servers can be implemented as applications within a VM or multiple separate VMs on the hardware system 105 and/or the second autonomous systems 155.

As an example, a first customer (e.g., customer 160a) might communicate with a second customer (e.g., customer 160b) via telephone through AIN 150 via a first application (e.g., a VoIP server or switch) running on a first VM within the virtual environment 110 running on the computer or hardware system 105, via the south bound interface 130 and the east/west interface 125. Meanwhile, a third customer (e.g., customer 160n) might be streaming a high-definition ("HD") movie via an IPTV server associated with one of the one or more second autonomous systems 155 via a second application running on a second VM within the virtual environment 110, via the south bound interface 130 and the east/west interface 125. At the same time, the BSS/OSS 145 might be providing business and/or operational support to one or more customers and customer connections via a third application running on a third VM within the virtual environment 110, via the north bound interface 120 and the south bound interface 130. In some aspects, the first, second, and third VMs might be the same VM, or any two of the first, second, or third VMs might be the same VM. In other aspects, the first, second, and third VMs are separate VMs.

While all of these processes are running, the resource usage state module 140 might monitor the physical and virtual states—that is, the physical state of the underlying computer or hardware system 105, and the virtual states of the virtual machine environment 110 or of each of the VMs running within the virtual machine environment 110, which can be managed by a hypervisor 135. In some cases, virtualized resources might be mapped to physical hardware resources of the hardware system 105. The virtualized resources might include any one or more of virtualized CPU resource, virtualized memory resource, virtualized disc storage resource, or virtualized interface resource.

An application controller/congestion engine 115 might receive requests for more hardware resources (e.g., CPU memory storage resources, and the like) of the computer or hardware system 105 (i.e., host system) from one or more of the first, second, or third applications. In some cases, the application congestion engine 115 might incorporate and/or might be incorporated within the functionality of the orchestrator 165 and hypervisor 135, while in other cases, the application controller might be a software component separate from the hypervisor 135.

An orchestrator without system constraints might typically continue to add more and more resources in response to the requests from each of the one or more of the first, second, or third applications running on the respective first, second, or third VMs, such that congestion occurs, which might lead to one or more applications "running over capacity," in turn resulting in a crash of the host system (i.e., computer or hardware system 105). Such a crash might interrupt services for some or all of the customers 160, and perhaps also customers associated with the one or more second autonomous systems 155.

One solution to this problem might include the use of a protocol with an intelligent device to implement push back message from the orchestrator to applications to start shedding load and reduce use of resources running on one or more VMs in the virtual environment 110. In some cases, overload conditions might be detected via communication interfaces, each of the interfaces 120-130 might contain "buffer monitoring" which can detect mass call conditions that cause the protocol stacks to be overflowing. Normally, an application would start pushing back on demands by sending "busy" congestion messages to slow the number of call setups per second, or it simply could start ignoring incoming messages, which is analogous to changing how often the system offers service historically referred to as scan rates in the interfaces 120-130 which are changed during congestion to shed processing requirements.

Commonly, once application load shedding occurs nonessential processes are shut down, and if required the number of sessions processed per second is reduced in order for the system to survive the mass call event.

We now turn to FIG. 2, which is a block diagram illustrating an exemplary system 200 for controlling virtualization congestion, in accordance with various embodiments. In FIG. 2, system 200 might comprise computer or hardware system 205. Computer or hardware system 205, in some embodiments, might serve as a host machine or host system that creates and operates a virtual environment (or virtual machine environment) 210, in which an application congestion controller 215 might run. The application congestion controller 215 (also referred to herein as an "application controller" or a "congestion engine") might be operatively coupled to a number of interfaces or components, including, but not limited to, a north or north bound interface 220, east/west interfaces 225, south or south bound interface 230, a hypervisor 235, and a resource usage state module 240, all of which might be executed within the virtual environment 210.

System 200 might further comprise a BSS/OSS 245, an AIN 250, one or more second autonomous systems 255, and one or more customers 260. In some embodiments, second autonomous systems 255 might include a computer or hardware system that might be similar to, identical to, or different from computer or hardware system 205. The one or more customers 260 might include customers 260a, 260b, through 260n. Each of customers 260a, 260b, through 260n might comprise a customer device including, but not limited to, POTS telephones, voice over Internet protocol ("VoIP") telephones, cellular telephones, smart phones, tablet computers, laptop computers, desktop computers, or the like.

Computer or hardware system 205 and the second autonomous systems 255 might be located at service provider facilities or premises, and might be associated with one or more of VoIP switches, IPTV servers, content servers (e.g., in a CDN), Internet servers, other network servers, and the like. In some cases, the computer or hardware system 205 and/or the second autonomous systems 255 might comprise one or more of VoIP switches/servers, IPTV servers, content servers, Internet servers, other network servers, and the like (each of which could be running as an application on a VM within the virtual environment 210). In a particular aspect, such servers can be implemented as applications within a VM or multiple separate VMs on the hardware system 205 and/or the second autonomous systems 255.

According to some embodiments, computer or hardware system 205, virtual environment (or virtual machine environment) 210, application congestion controller 215, north bound interface 220, east/west interfaces 225, south bound interface 230, hypervisor 235, resource usage state module 240, BSS/OSS 245, AIN 250, the one or more second autonomous systems 255, and the one or more customers 260 might be the same or similar in terms of structure, functionality, or the like as the corresponding components in FIG. 1.

Turning back to FIG. 2, system 200 might further comprise orchestrator 265, which might include an orchestrator 265a external to the computer or hardware system 205, an orchestrator 265b running on the virtual environment 210 on the computer or hardware system 205, or both. Each orchestrator might comprise a mass event state engine 270 (i.e., orchestrator 265a might comprise mass event state engine 270a, while orchestrator 265b might comprise mass event state engine 270b, as shown in FIG. 2). In some instances, hypervisor 235 might also comprise a mass event state engine (e.g., mass event state engine 270c shown in FIG. 2). Each mass event state engine 270 might be configured to monitor for mass events and/or mass congestion indicators.

Unlike a conventional hypervisor, the orchestrator 265 might coordinate with the resource usage state module 240 (i.e., by communicating with it) to identify the maximum hardware resources of the host system 205, as well as the currently used hardware resources and the currently available resources. Based on such identifications or determinations, the orchestrator 265 might regulate, rather than simply allocate, hardware resources (e.g., CPU memory storage resources, and the like) that might be used by the applications running on the one or more VMs in the virtual environment 210. In other words, the orchestrator 265 might establish bounds for resources allocated to each application based on these determinations, and perhaps based on priority or importance of each application. For example, government and/or emergency service applications (including, but not limited to, Government Emergency Telecommunications Service ("GETS"), or the like) might be given top priority and provided with all the available hardware resources in lieu of other lower priority applications. In some cases, the orchestrator 265 might push back on the excessive hardware resource usage by the one or more applications. According to some embodiments, the orchestrator 265 might provide the one or more applications with a mechanism for controlling push back (see, for example, the buffer utilization feedback discussed below).

Further, the orchestrator 265 might concurrently monitor for mass events and/or mass congestion, by monitoring for indicators of mass events and/or mass congestion using mass event state engine 270. In some cases, such indicators might include, without limitation, a predetermined threshold level of resource usage being exceeded, or a determination that an emergency reserve that is set aside out of the available resources begins to be used, or the like. In some embodiments, such indicators might include receiving requests for service or resource usage that exceeds normal or typical usage requests. For example, a normal call volume in New York might typically be about 100 calls per second, but during events of "September 11," about 4000 calls per second were being connected (or terminated). In other words, the indicators of mass events might include exceeding the normal number of call requests by a predetermined threshold (including, but not limited to 300%, 400%, 500%, 1000% of normal/typical levels, or the like).

Based on a determination that such indicators are present, the orchestrator 265 might modify resource allocations downward to reflect congestion control (to adjust to pre-set congestion boundaries, or the like), and might send signals to one or more applications to load shed (i.e., to reduce the amount of resource usage). The application congestion controller 215 might comprise a load shedding function 275, which might cause the one or more applications to begin load shedding. In some cases, the load shedding function 275 might cause load shedding (or forced load shedding) of one application at a time. In other cases, the load shedding function 275 might cause load shedding (or forced load shedding) of more than one application at a time.

Orchestrator 265 might provide two-way communication with each of the applications (e.g., the first, second, and third applications described above with respect to FIG. 1) running on the one or more VMs (e.g., the first, second, and third VMs described above) in the virtual environment 210 on the computer or hardware system 205. The two-way communications might include information regarding maximum hardware resources and information regarding current (used or available) hardware resources provided from the orchestrator 265 (or from the one or more VMs or from the hypervisor 235) running in the virtual environment 210 on the computer or hardware system 205 to each of the applications. In a mass event, where the Orchestrator controller has set a limit for an application, the application controller needs to know that it needs to load shed inside of the currently allocated resources. To facilitate this, the two-way communications might also include a system pre-congestion notification from the orchestrator 265 to each of the applications, prior to reaching the limit on the available resources (which might occur, e.g., when an emergency reserve that is set aside out of the available resources begins to be used, or the like). The system pre-congestion notification might include three types of messages: (1) "start load shedding"; (2) "load shed on your own"; and (3) "stop cross-utilization during mass event and/or mass congestion." The two-way communications might further include an application pre-congestion notification or a low utilization notification from one or more applications to the orchestrator 265 (or to the one or more VMs or to the hypervisor 235). The application pre-congestion notification might include a notification to the orchestrator 265 indicating that the one or more applications might be (or might soon be) utilizing more resources that might result in congestion. A protocol—including, but not limited to, a congestion application programming interface ("API")—might be utilized to establish (and/or maintain) the two-way communications between the one or more VMs (or the hypervisor 235) and each of the applications.

Because the orchestrator 265 provides two-way communications between the one or more VMs (or the hypervisor 235) and the applications, there is continual negotiation and collaboration amongst the various components, such that sudden failure, sudden service drops, sudden interruptions, and the like are mitigated or obviated. Accordingly, the orchestrator 265, in response to a notification from one or more applications requesting more hardware resources, might be able to determine whether there are any available resources (by obtaining the information regarding maximum hardware resources and information regarding current (used or available) hardware resources from the resource usage status module 240). Based on a determination that there are available resources, the orchestrator 265 might allocate the requested hardware resources to the one or more requesting applications. On the other hand, if it is determined that insufficient hardware resources are available, the orchestrator 265 might determine which of the one or more requesting applications are priority applications, or might rank the one or more requesting applications according to priority (e.g., GETS applications or other emergency telephone applications might have priority over a normal VoIP application, etc.).

Likewise, in response to a notification from one or more applications indicating low utilization of hardware resources, the VM 210, the hypervisor 235, or the orchestrator 265 might recover some or all of the unused or under-utilized hardware resources from the one or more low-usage applications.

In some embodiments, during a non-congestion condition (e.g., a normal condition), the one or more applications might request hardware resources and might receive all the requested hardware resources. However, in a congestion condition (such as described above), which might be triggered by a determination that mass event and/or mass congestion indicators are present, the orchestrator might cause the one or more applications to drop resource usage to preset congestion boundaries. In some cases, the preset congestion boundaries might include setting aside a first portion of the hardware resources as an emergency reserve (e.g., for GETS or other emergency or government application, or the like), a second portion that is equally divided amongst the one or more applications. For example, for two applications running in the VM environment, the preset congestion boundaries might include 20% of the resources set aside for the emergency reserve, 40% for the first application, and 40% for the second application. In such an example, the orchestrator might cause forced load shedding of the first and second applications to the 40% level for each application, in the case that these applications do not load shed on their own to that level. In other cases, rather than equally dividing the second portion amongst the one or more applications, the second portion might be proportionally divided amongst the one or more applications based on current resource usage at, or prior to, the time the congestion condition is triggered. For example, if, during normal conditions, the first application used three times as many resources as the second application, then the preset congestion boundaries might include 20% for the emergency reserve, 60% for the first application, and 20% for the second application. Although the examples above refer to two applications, any number of applications might be running at the same time, and the equal or proportional portions of the second portion might be allocated accordingly.

According to some embodiments, to facilitate state tracking at the virtualized north interface 220, the east/west interface 225, and the south interface 230, buffer utilization feedback via the hypervisor 235 and possibly through the orchestrator 265 might be added to the applications from the VM environment 210. In such a case, the applications might be provided with the ability or capability to control the pushback mechanism through this input (i.e., the buffer utilization feedback input) by detecting high utilization rates, and triggering congestion control via signaling autonomous systems to slow down their call processing to the application.

In some aspects, the hypervisor 235 might assign application resources of the VM 210, which is operating on the host computing system (e.g., the computer or hardware system 205), with maximum allowable settings to each of one or more software applications to be executed on the VM 210. The hypervisor 235 or the orchestrator 265 might determine a running mode of the host computing system, and might execute the one or more software applications on the VM 210 using running mode attributes of the determined running mode of the host computing system. In some embodiments, the running mode might be selected from a group consisting of a normal running mode ("L0 mode"), a first level crisis mode ("L1 mode"), a second level crisis mode ("L2 mode"), and a third level crisis mode ("L3 mode"). In some cases, the second level crisis mode might define a smaller minimum resource allocation level compared with the first level crisis mode, while the third level crisis mode might define a smaller minimum resource allocation level compared with the second level crisis mode. In other words, as the level of crisis mode escalates (from L1 to L3), the amount of resources allocated to the one or more software applications decreases, to allow for high priority applications (e.g., emergency operations and functions, including, without limitation, GETS, or the like) to utilize the available resources. Each of the first through third level crisis modes might, in some instances, further define predetermined running mode attributes. For example, the predetermined running mode attributes of the L1 mode might include dumping non-essential software applications, the predetermined running mode attributes of the L2 mode might include staging workload reductions of remaining software applications, and the predetermined running mode attributes of the L3 mode might include slowing processing of the remaining software applications.

Figure 4:
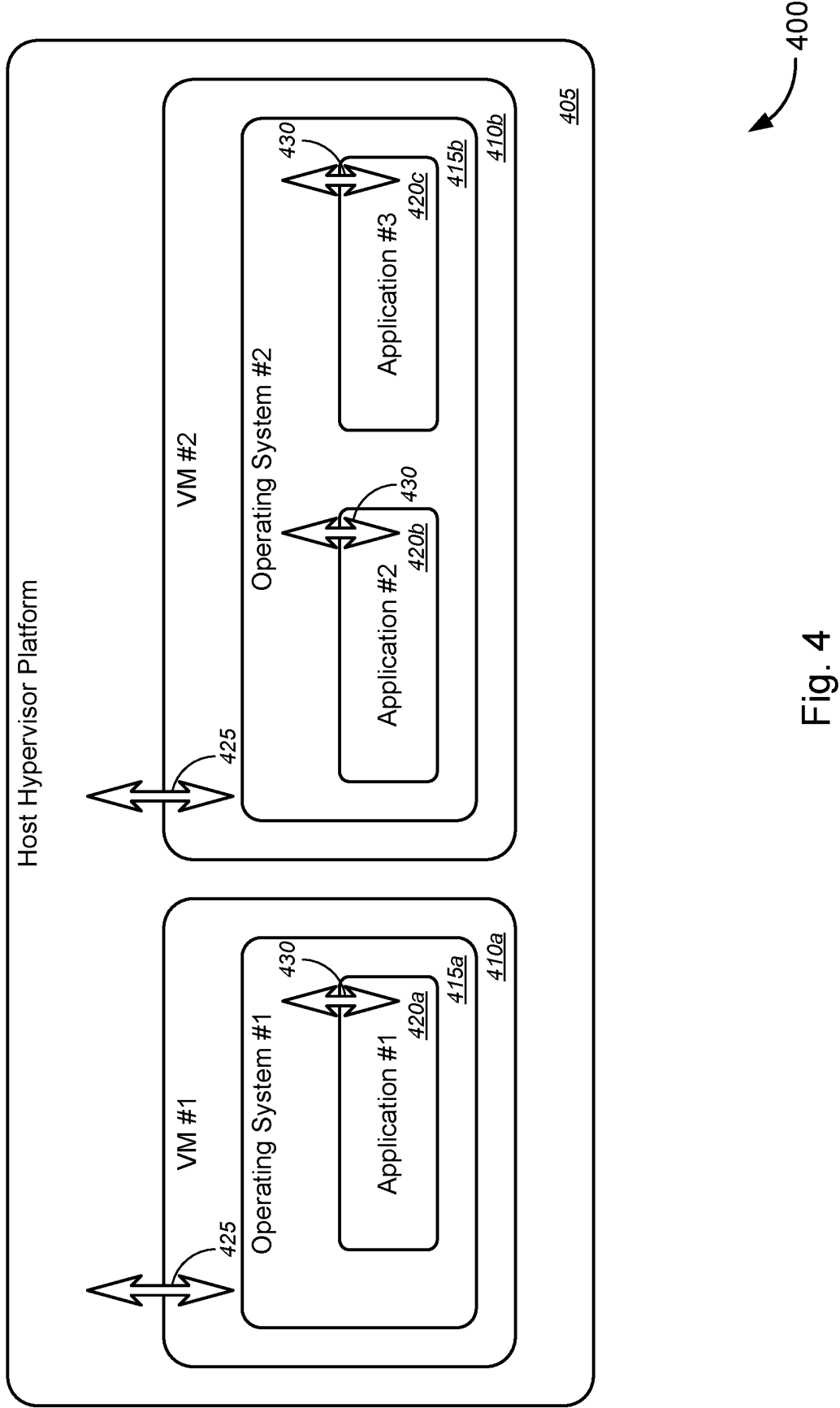
FIG. 4 is a general schematic diagram illustrating a system for controlling virtualization congestion, in accordance with various embodiments.

The hypervisor 235 or an operating system running within the VM 210 (e.g., as shown in FIG. 4) might monitor application resource utilization of the host computing system. In some instances, the hypervisor 235 or the operating system might monitor resource utilization by using the resource usage state module 240. Based on a determination that application resource utilization has changed, the hypervisor 235 or the orchestrator 265 might modify allocation of application resources of the VM 210 to each of the one or more software applications.

In some instances, the hypervisor 235 or the orchestrator 265 might monitor the host computing system (e.g., the computer or hardware system 205) and/or one or more networks (e.g., to which the computer or hardware system 205 is communicatively coupled to the second autonomous systems 255) for presence of mass congestion or mass event indicators (as described in detail above). Based on a determination that at least one mass congestion indicator is present, the hypervisor 235 or the orchestrator 265 might modify the running mode of the host computing system. The hypervisor 235 might subsequently execute the one or more software applications on the VM 210 using running mode attributes of the modified running mode of the host computing system. In some cases, the at least one mass congestion indicator might correspond to one of the L1 mode, L2 mode, or L3 mode.

According to some embodiments, based on a determination that application resource utilization has changed and based on a determination that the host computing system is in the L0 mode (e.g., normal mode or non-congested condition), the hypervisor 235 or the orchestrator 265 might restrict allocation of additional resources to each of the operating system and the one or more software applications. In other words, even in a normal mode, if the system determines that application resource utilization has changed, the system might hold-off on allocating additional resources to the operating system and the one or more software applications. This allows the system an opportunity to assess whether the system might be headed toward a congestion situation (from a minimal congestion situation to a mass congestion situation, etc.) or whether the system is experiencing temporary fluctuations. Once the application resource utilization stabilizes, and the system remains in the L0 mode, the hypervisor 235 or the orchestrator 265 might relax the restriction on the allocation of additional resources to each of the operating system and the one or more software applications.

In some cases, the hypervisor 235 or the orchestrator 265 might determine whether the running mode of the host computing system has changed, based on the monitored application resource utilization of the host computing system. In such a case, the hypervisor 235 or the orchestrator 265 modifying allocation of application resources of the VM 210 to each of the one or more software applications might comprise the hypervisor 235 or the orchestrator 265 modifying settings of the running mode of the host computing system.

In some instances, the hypervisor 235 or the orchestrator 265 modifying allocation of application resources of the VM 210 to each of the one or more software applications, based on a determination that application resource utilization has changed, might comprise the hypervisor 235 or the orchestrator 265 performing at least one of increasing allocation of application resources of the VM 210 to a first set of the one or more software applications or decreasing allocation of application resources of the VM 210 to a second set of the one or more software applications, based on a determination that application resource utilization is approaching maximum resource use.

Figure 3:
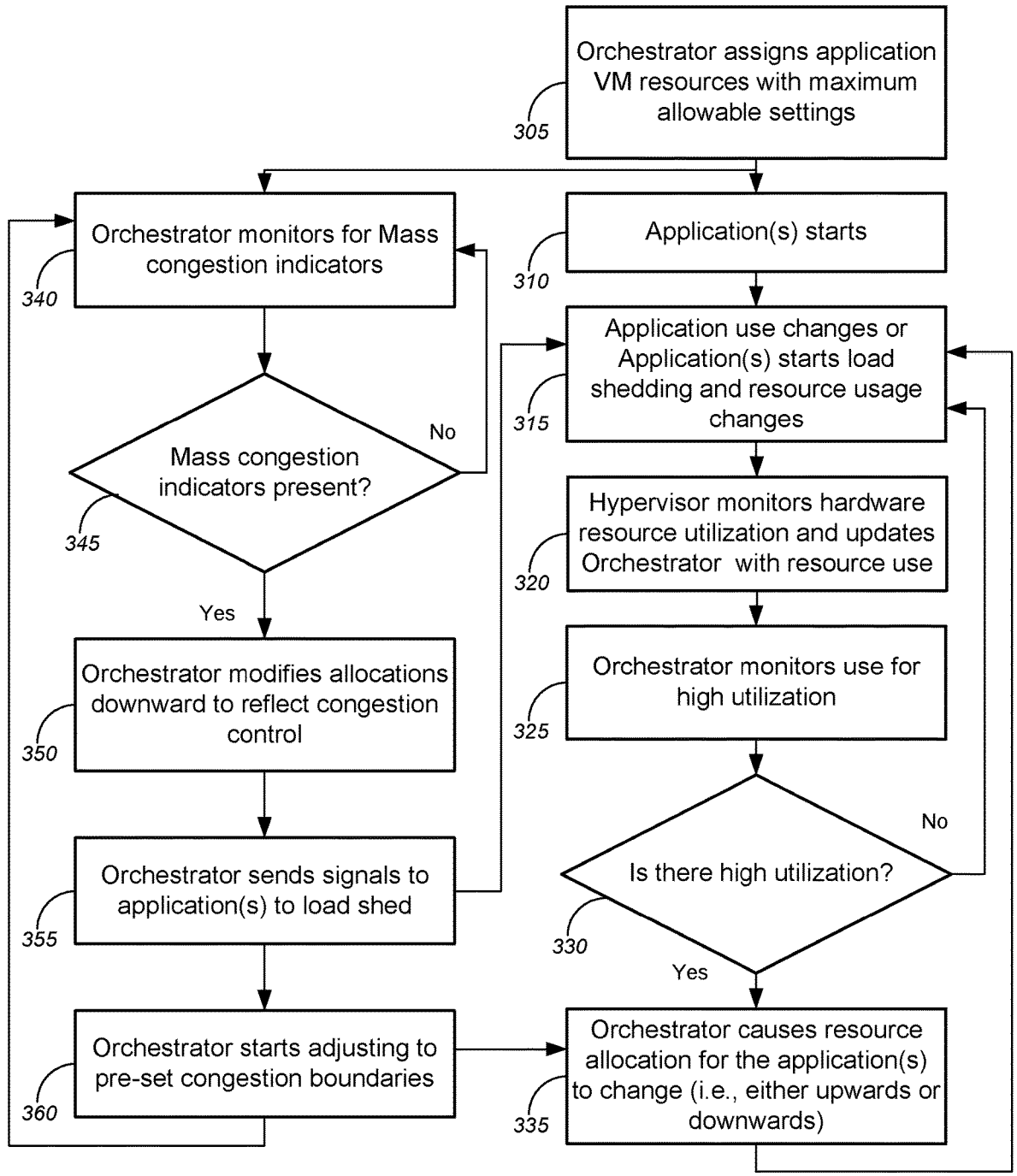
FIG. 3 is a flow diagram illustrating a method for implementing virtualization congestion control and hardware resource allocation and management, in accordance with various embodiments.

FIG. 3 is a flow diagram illustrating a method 300 for implementing virtualization congestion control and hardware resource allocation and management, in accordance with various embodiments. In FIG. 3, process 300 might comprise assigning, with an orchestrator (e.g., orchestrator 265), application VM resources with maximum allowable settings to one or more software applications (block 305). At block 310, the one or more applications might start (i.e., might begin execution in the VM environment).

The resource use by at least one of the one or more applications might change (block 315). Alternatively, or in addition, one or more of the applications might start load shedding (i.e., decreasing resource usage). In both cases, resource usage might change; in some cases, this might include overall resource usage or resource usage of some of the resources. At block 320, a hypervisor (e.g., hypervisor 235) might monitor the actual hardware resource utilization (and in some cases, by using, e.g., resource usage state module 240, or the like), and might update the orchestrator with the actual hardware resource usage. In other cases, the orchestrator might monitor the actual hardware resource utilization and/or directly communicate with the resource usage state module 240, or the like. The orchestrator might, at block 325, monitor for high utilization, based on the hardware resource usage information from the hypervisor. A determination might then be made, at block 330, by the orchestrator as to whether there is high utilization of hardware resources by at least one application. If it is determined that there is no high utilization of hardware resources by any or all applications, the process 300 might return to block 315, and might wait for a change in either resource use by at least one of the one or more applications and/or resource usage. If it is determined, however, that there is high utilization by at least one application, the process 300 might proceed to block 335.

At block 335, the orchestrator might cause resource allocation of the at least one application to change (either upwards or downwards). Alternatively, or in addition, the orchestrator might cause resource allocation of applications other than the at least one application to change (either upwards or downwards). In some cases, the orchestrator might force one or more applications to decrease its resource usage ("forced load shedding"). In other cases, such as when a first application sends a low utilization notification to the orchestrator, while a second application sends an application pre-congestion notification, the orchestrator might cause the resource allocation of the first application to decrease (i.e., recover hardware resources from the first application), and might thereafter cause the resource allocation of the second application to increase. The process might return to block 315, where the resource use by the one or more applications (and accordingly the resource usage) might change in response to the resource allocation changes (e.g., recovery, forced load shedding, or greater allocation, or the like) caused by the orchestrator.

Concurrent with the steps at blocks 310-335, the orchestrator might, at block 340, actively or continually monitor for mass congestion and/or mass event indicators (which might include, without limitation, a predetermined trigger or utilization or performance threshold level of resource usage being exceeded, or a determination that an emergency reserve that is set aside out of the available resources begins to be used, or the like). A predetermined threshold value might include, without limitation, a percentage of maximum CPU resources, a percentage of maximum memory resources, a percentage of maximum disc storage resource, a percentage of maximum interface resources, a combination of these percentages, an overall percentage of maximum resources, a fixed amount corresponding to available resources among any one or more of CPU resources, memory resources, disc storage resources, or interface resources.

For example, if the maximum memory is 200 gigabytes or 200 GBs, while the total current memory usage is 191 GBs, and the threshold level is 90%, then the total current memory usage (191 GBs) exceeds 90% of the maximum memory. Although this example uses a threshold level of 90%, any appropriate level (including, without limitation, 85%, 90%, 95%, 96%, 97%, 98%, 99%, or any range of threshold percentages, e.g., between 80% and 100%, or the like, may be used). Although percentages are used in the example, fixed amounts may be used. For instance, a threshold value of 150 GBs, 175 GBs, 190 GBs, 195 GBs, or the like (for a maximum memory size of 200 GBs, for example), or any equivalent proportion of any other maximum memory size, may be used as the threshold level. In other examples, the threshold value might include, without limitation, 300%, 400%, 500%, 1000% of normal/typical levels, or the like. Any other suitable threshold values may also be used, as appropriate.

A determination might be made, by the orchestrator at block 345, as to whether a mass congestion indicator is present. Based on a determination that a mass congestion indicator is not present, the process 300 returns to block 340, at which the orchestrator continues to monitor. On the other hand, if a determination is made that a mass congestion indicator is present, the process 300 might proceed to block 350.

In such a case, the orchestrator might determine that resource allocations should be modified, and as a result, at block 350, the orchestrator might modify allocations of resource usage downward to reflect congestion control. The orchestrator might, at block 355, send signals to the one or more applications to load shed or to begin load shedding (in a manner akin to a passive request, compared with the forced load shedding), which might result in at least one of the one or more applications starting to load shed (at block 315). The orchestrator might concurrently, or sequentially, start adjusting to pre-set congestion boundaries (block 360), which might result in the orchestrator implementing forced load shedding (block 335) in the case that the at least one of the one or more applications does not start to load shed based on the signals sent at block 355. Thereafter, the process might return to block 340, at which the orchestrator might continue to actively monitor for mass congestion and/or mass event indicators.

In any event, priority applications (including, but not limited to, GETS or some other emergency or government application, or the like) might be exempt from any load shedding or any forced load shedding. In other words, the orchestrator might send signals to other applications to load shed and/or might cause forced load shedding of other applications, but (by design) will not in any way slow down priority applications such as GETS or other emergency or government applications. As discussed above with respect to FIG. 2, during a normal condition, the one or more applications might receive all the resources that each application requests. However, during a congestion condition, the orchestrator might adjust usages to pre-set congestion boundaries, which might include, without limitation, a first portion for an emergency reserve (e.g., for the priority applications including GETS, other emergency applications, and the like), and a second portion for the applications. The second portion, in some cases, might be divided equally amongst all of the one or more applications, while, in other cases, might be divided proportionally amongst the one or more applications based on proportion of hardware resource usage prior to, or at the time of, the congestion trigger (i.e., at the time a determination is made that mass congestion and/or mass event indicators are present).

In FIG. 4, a general schematic diagram is shown illustrating a system 400 for controlling virtualization congestion, in accordance with various embodiments. System 400 might comprise a host hypervisor platform 405 on which one or more virtual machine ("VM") environments 410 might operate. VM 410 might comprise a first VM 410a and a second VM 410b, or the like. Running on each VM 410 might be one or more operating systems 415. For example, a first operating system 415a might run on the first VM 410a, while a second operating system 415b might run on the second VM 410b. Each of the operating systems 415 might have running thereon one or more software applications 420. In the non-limiting example of FIG. 4, a first application 420a might run on the first operating system 415a, while a second application 420b and a third application 420c might each be running on the second operating system 415b. The hypervisor 405 might modify allocation of the application resources (including, but not limited to, memory and/or processor resources, etc.) between the hypervisor 405 and each VM 410, as shown by arrow 425. Alternatively, or in addition, the hypervisor 405 might modify allocation of the application resources (including, but not limited to, memory and/or processor resources, etc.) between each operating system 415 and each software application 420, as shown by arrow 430. In some cases, the host hypervisor platform 405 or an operating system 415 running within one of the VMs 410 might monitor application resource utilization of the host computer system, and the hypervisor 405 might modify allocation of application resources (e.g., as shown by one or both of arrows 425 and 430), based on a determination that application resource utilization has changed. According to some embodiments, the hypervisor 405 might modify allocation of application resources by increasing allocation of application resources to a first set of the one or more software applications, by decreasing allocation of application resources to a second set of the one or more software applications, or both. Such allocation of resources might, in some instances, be based on a determination that application resource utilization is approaching maximum resource use.

Figure 5:
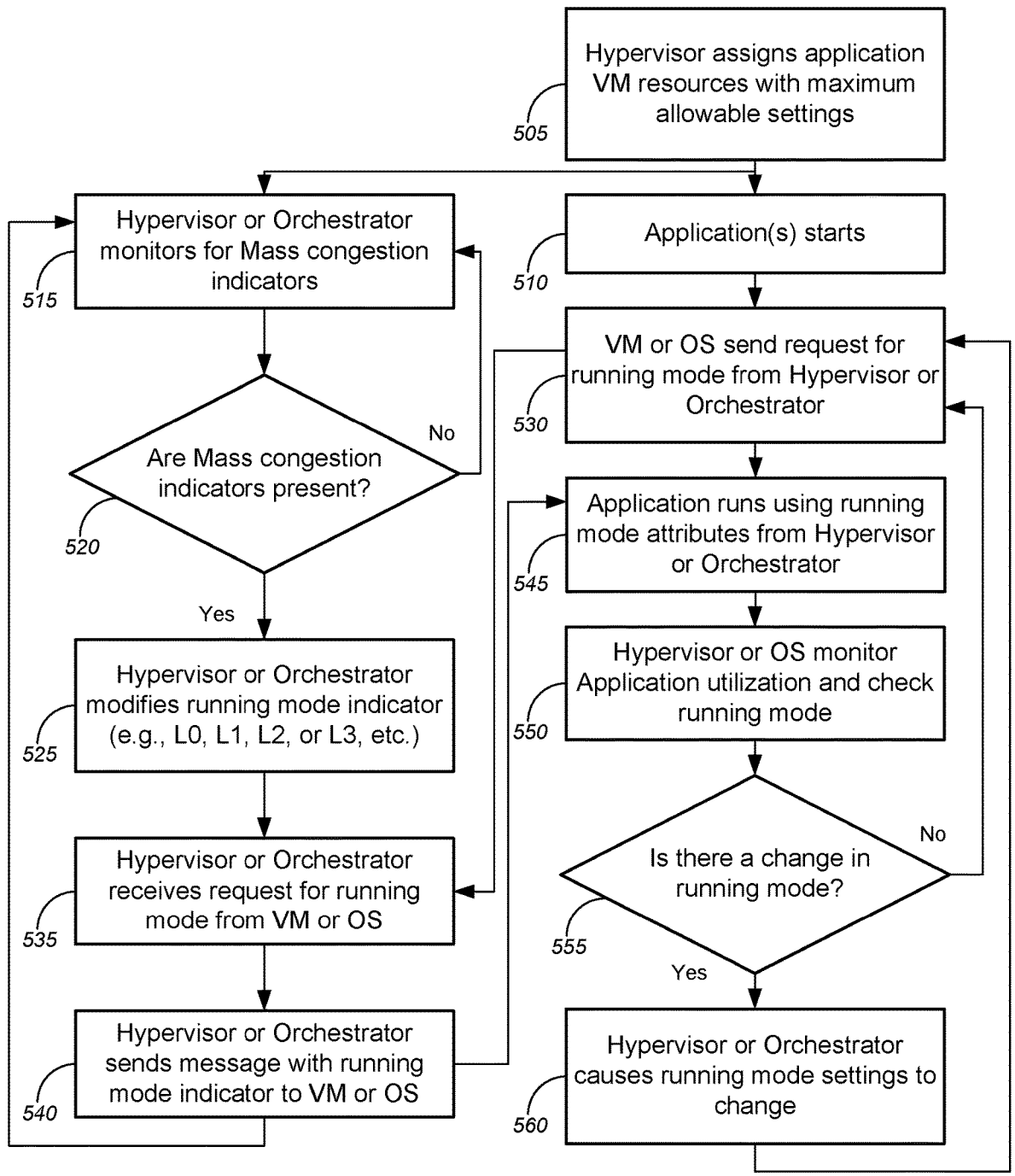
FIG. 5 is a flow diagram illustrating another method for implementing virtualization congestion control and hardware resource allocation and management, in accordance with various embodiments.
Figure 6:
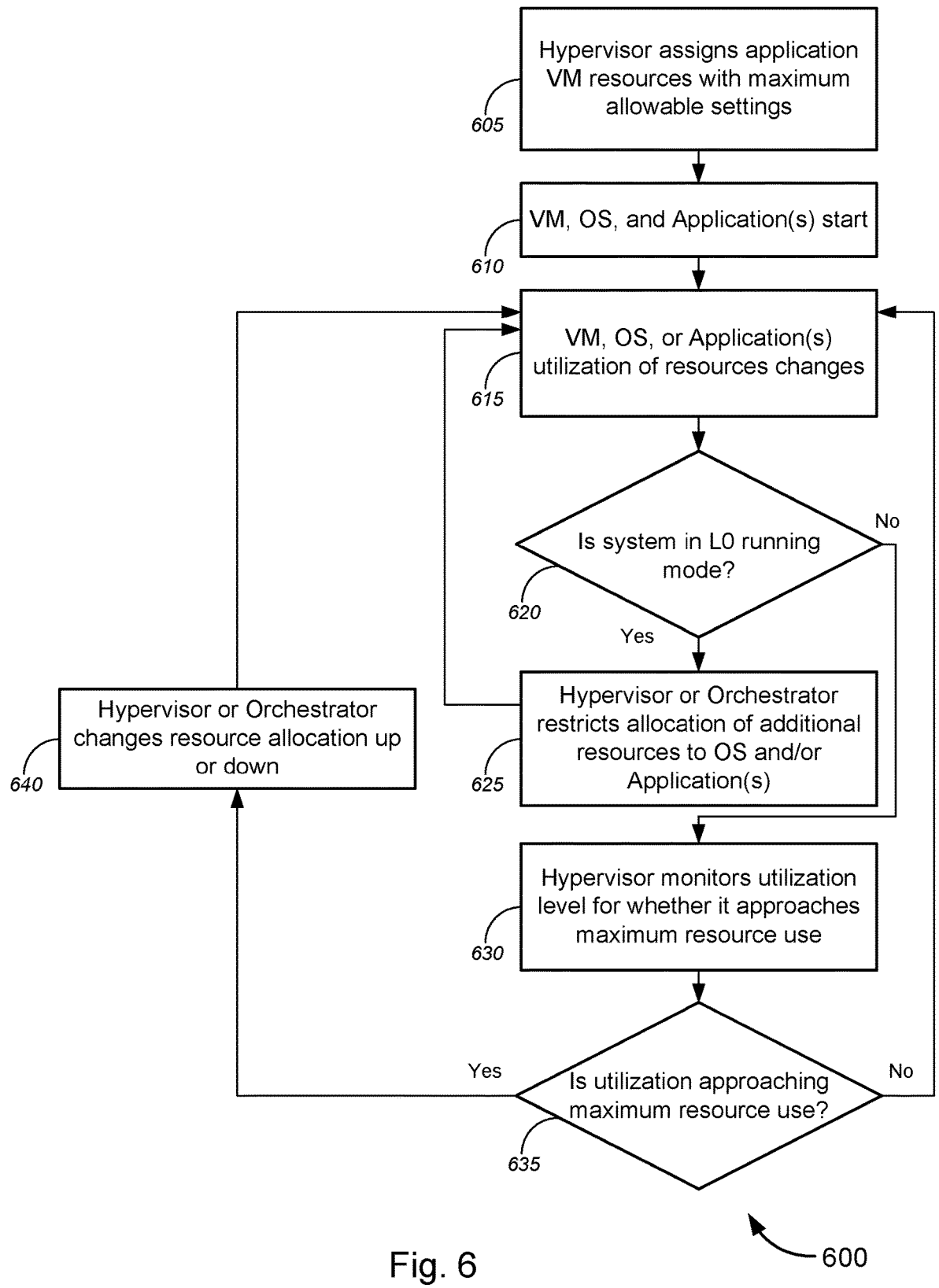
FIG. 6 is a flow diagram illustrating yet another method for implementing virtualization congestion control and hardware resource allocation and management, in accordance with various embodiments.

We now turn to FIGS. 5 and 6, which are flow diagrams illustrating methods 500 and 600 for implementing virtualization congestion control and hardware resource allocation and management, in accordance with various embodiments. In FIG. 5, process 500 might comprise assigning, with a hypervisor (e.g., hypervisor 235 or 405), application VM resources with maximum allowable settings to one or more software applications (block 505). In some instances, an orchestrator (e.g., orchestrator 265) might assign application VM resources with maximum allowable settings to the one or more software applications. At block 510, the one or more software applications might start (i.e., might begin execution in the VM environment). Concurrent with the one or more software applications starting, the hypervisor or an orchestrator might, at block 515, actively or continually monitor for mass congestion and/or mass event indicators (which might include, without limitation, a predetermined trigger or utilization or performance threshold level of resource usage being exceeded, or a determination that an emergency reserve that is set aside out of the available resources begins to be used, or the like). A predetermined threshold value might include, without limitation, a percentage of maximum CPU resources, a percentage of maximum memory resources, a percentage of maximum disc storage resource, a percentage of maximum interface resources, a combination of these percentages, an overall percentage of maximum resources, a fixed amount corresponding to available resources among any one or more of CPU resources, memory resources, disc storage resources, or interface resources.

For example, if the maximum memory is 200 gigabytes or 200 GBs, while the total current memory usage is 191 GBs, and the threshold level is 90%, then the total current memory usage (191 GBs) exceeds 90% of the maximum memory. Although this example uses a threshold level of 90%, any appropriate level (including, without limitation, 85%, 90%, 95%, 96%, 97%, 98%, 99%, or any range of threshold percentages, e.g., between 80% and 100%, or the like, may be used). Although percentages are used in the example, fixed amounts may be used. For instance, a threshold value of 150 GBs, 175 GBs, 190 GBs, 195 GBs, or the like (for a maximum memory size of 200 GBs, for example), or any equivalent proportion of any other maximum memory size, may be used as the threshold level. In other examples, the threshold value might include, without limitation, 300%, 400%, 500%, 1000% of normal/typical levels, or the like. Any other suitable threshold values may also be used, as appropriate.

A determination might be made, by the hypervisor or the orchestrator at block 520, as to whether a mass congestion indicator is present. Based on a determination that a mass congestion indicator is not present, the process 500 returns to block 515, at which the hypervisor or the orchestrator continues to monitor. On the other hand, if a determination is made that a mass congestion indicator is present, the process 500 might proceed to block 525.

In such a case, the hypervisor or the orchestrator might modify a running mode indicator of the host computing system (block 525). In some cases, the running mode might be selected from a group consisting of a normal running mode ("L0 mode"), a first level crisis mode ("L1 mode"), a second level crisis mode ("L2 mode"), and a third level crisis mode ("L3 mode"). In some cases, the second level crisis mode might define a smaller minimum resource allocation level compared with the first level crisis mode, while the third level crisis mode might define a smaller minimum resource allocation level compared with the second level crisis mode. In other words, as the level of crisis mode escalates (from L1 to L3), the amount of resources allocated to the one or more software applications decreases, to allow for high priority applications (e.g., emergency operations and functions, including, without limitation, GETS, or the like) to utilize the available resources. Each of the first through third level crisis modes might, in some instances, further define predetermined running mode attributes. For example, the predetermined running mode attributes of the L1 mode might include dumping non-essential software applications, the predetermined running mode attributes of the L2 mode might include staging workload reductions of remaining software applications, and the predetermined running mode attributes of the L3 mode might include slowing processing of the remaining software applications. In other words, the process at block 525 might include modifying a running mode indicator from an L0 mode to one of an L1 mode, an L2 mode, or an L3 mode.

After the one or more software applications start (at block 510), the VM or the operating system might, at block 530, send a request for the running mode from the hypervisor or the orchestrator, which request might be received at block 535. At block 540, the hypervisor or the orchestrator might send a message (which might include the running mode indicator) to the VM or the operating system. Subsequently, the process might return to block 515 for continual monitoring, while at block 545, the one or more applications might be caused to run using the running mode attributes from the hypervisor or the orchestrator. For example, for an L1 mode, the one or more applications might run, such that non-essential software applications among the one or more applications are dumped. For an L2 mode, after all the non-essential applications are dumped, workload reductions might be staged for each of the remaining software applications among the one or more applications. For an L3 mode, after all the non-essential applications have been dumped and after workload reductions have been staged for remaining software applications, processing of the remaining software applications might be slowed.

At block 550, the hypervisor or the operating system might monitor the application utilization and might check the running mode. A determination might be made, at block 555, as to whether there is a change in the running mode. If not, the process returns to block 530. If so, the process proceeds to block 560, at which the hypervisor or the orchestrator might cause the running mode settings to change. In some cases, the operating system might also cause the running mode settings to change. The process subsequently returns to block 530.

In FIG. 6, process 600 might comprise assigning, with a hypervisor (e.g., hypervisor 235 or 405), application VM resources with maximum allowable settings to one or more software applications (block 605). In some instances, an orchestrator (e.g., orchestrator 265) might assign application VM resources with maximum allowable settings to the one or more software applications. At block 610, the one or more software applications might start (i.e., might begin execution in the VM environment). In some cases, the VM and the operating system might also start at block 610.

Utilization of resources by at least one of the VM, operating system, or the one or more software applications might change (block 615). A determination might be made, at block 620, as to whether the system is in an L0 running mode (i.e., normal or non-congested condition). If so, the process continues at block 625, at which the hypervisor or orchestrator might restrict allocation of additional resources to the operating system and/or the one or more software applications. The process might subsequently return to block 615. On the other hand, if it is determined that the system is not in the L0 running mode, the process skips to block 630, at which the hypervisor monitors the utilization level for whether it approaches maximum resource use. At block 635, it is determined whether the monitored utilization does approach maximum resource use. If not, the process returns to block 615. If so, the process proceeds to block 640. At block 640, the hypervisor or orchestrator might change resource allocation upward or downward. For example, the hypervisor or orchestrator might decrease resource allocation to low priority software applications, while increasing resource allocation to high priority software applications (e.g., emergency applications, such as GETS or the like). Thereafter, the process might return to block 615.

Figure 7:
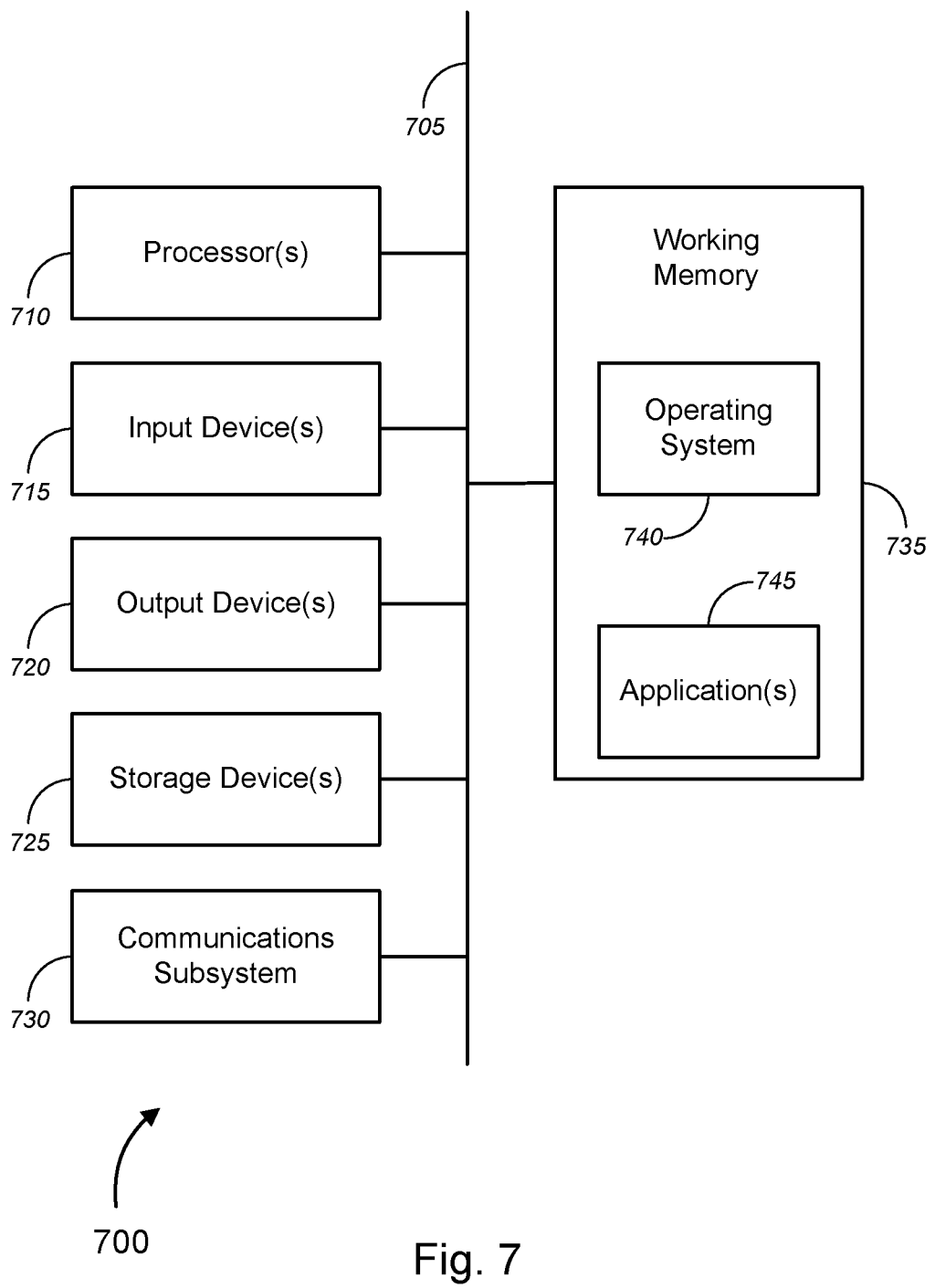
FIG. 7 is a block diagram illustrating an exemplary computer or system hardware architecture, in accordance with various embodiments.

FIG. 7 is a block diagram illustrating an exemplary computer or system hardware architecture, in accordance with various embodiments. FIG. 7 provides a schematic illustration of one embodiment of a computer system 700 of the service provider system hardware that can perform the methods provided by various other embodiments, as described herein, and/or can perform the functions of computer or hardware system (i.e., host system) 105, 205 as described above. It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer or hardware system 700—which might represent an embodiment of the computer or hardware system or host system 105, 205 described above with respect to FIGS. 1 and 2—is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a mouse, a keyboard and/or the like; and one or more output devices 720, which can include without limitation a display device, a printer, and/or the like.

The computer or hardware system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer or hardware system 700 might also include a communications subsystem 730, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 730 may permit data to be exchanged with a network (such as the network described below, to name one example), with other computer or hardware systems, and/or with any other devices described herein. In many embodiments, the computer or hardware system 700 will further comprise a working memory 735, which can include a RAM or ROM device, as described above.

The computer or hardware system 700 also may comprise software elements, shown as being currently located within the working memory 735, including an operating system 740, device drivers, executable libraries, and/or other code, such as one or more application programs 745, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 700 and/or might take the form of source and/or installable code, which, upon compilation and/or installation on the computer or hardware system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 700) to perform methods in accordance with various embodiments of the invention. According to a set of embodiments, some or all of the procedures of such methods are performed by the computer or hardware system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. Such a medium may take many forms, including, but not limited to, non-volatile media, volatile media, and transmission media. Non-volatile media includes, for example, optical and/or magnetic disks, such as the storage device(s) 725. Volatile media includes, without limitation, dynamic memory, such as the working memory 735. Transmission media includes, without limitation, coaxial cables, copper wire and fiber optics, including the wires that comprise the bus 705, as well as the various components of the communication subsystem 730 (and/or the media by which the communications subsystem 730 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method for implementing a virtualization congestion control framework within a host computing system, comprising:

assigning, with a hypervisor, application resources of a virtual machine ("VM"), which is operating on the host computing system, with maximum allowable settings to each of one or more software applications to be executed on the VM;

determining, with one of the hypervisor or an orchestrator, a running mode of the host computing system, wherein the running mode of the host computing system is based in part on a first level of utilization of hardware components of the host computing system and based in part on a second level of utilization of emergency reserve components, wherein the emergency reserve components are set aside for at least one of emergency applications or government applications;

based on a determination of the running mode associated with the level of utilization of hardware components of the host computing system, executing, with the hypervisor, operation of the one or more software applications on the VM using running mode attributes of the determined running mode of the host computing system;

establishing a buffer utilization feedback between the VM and the one or more software applications, wherein the buffer utilization feedback allows the one or more software applications to push back against modification of hardware resource usage;

monitoring, with one of the hypervisor or an operating system running within the VM, application resource utilization of the host computing system; and based on a determination that application resource utilization has changed, modifying, with one of the hypervisor or the orchestrator, allocation of application resources of the VM to each of the one or more software applications.

2. The method of claim 1, wherein the running mode is selected from a group consisting of a normal running mode ("L0 mode"), a first level crisis mode ("L1 mode"), a second level crisis mode ("L2 mode"), and a third level crisis mode ("L3 mode"), wherein the second level crisis mode defines a smaller minimum resource allocation level compared with the first level crisis mode and the third level crisis mode defines a smaller minimum resource allocation level compared with the second level crisis mode.

3. The method of claim 2, wherein each of the first through third level crisis modes further defines predetermined running mode attributes, wherein the predetermined running mode attributes of the L1 mode include dumping non-essential software applications, the predetermined running mode attributes of the L2 mode include staging workload reductions of remaining software applications, and the predetermined running mode attributes of the L3 mode include slowing processing of the remaining software applications.

4. The method of claim 2, further comprising:

monitoring, with one of the hypervisor or the orchestrator, the host computing system and one or more networks, through which the host computing system is communicatively coupled to other computer systems, for presence of mass congestion indicators;

based on a determination that at least one mass congestion indicator is present, modifying, with one of the hypervisor or the orchestrator, the running mode of the host computing system; and executing, with the hypervisor, the one or more software applications on the VM using running mode attributes of the modified running mode of the host computing system.

5. The method of claim 4, wherein the at least one mass congestion indicator corresponds to one of the L1 mode, L2 mode, or L3 mode.

6. The method of claim 4, wherein the mass congestion indicators include the application resource utilization exceeding a threshold level.

7. The method of claim 6, wherein the threshold level includes a threshold percentage selected from a group of percentages consisting of 85%, 90%, 95%, 96%, 97%, 98%, or 99% of a maximum available resource, or a range of threshold percentages between 80% and 100% of the maximum available resource.

8. The method of claim 6, wherein the threshold level includes a threshold value selected from a group of values consisting of 150 GBs, 175 GBs, 190 GBs, and 195 GBs.

9. The method of claim 2, further comprising:

based on a determination that application resource utilization has changed and based on a determination that the host computing system is in the L0 mode, restricting, with one of the hypervisor or the orchestrator, allocation of additional resources to each of the operating system and the one or more software applications.

10. The method of claim 1, further comprising:

determining, with one of the hypervisor or the operating system, whether the running mode of the host computing system has changed, based on the monitored application resource utilization of the host computing system, wherein modifying, with one of the hypervisor or the orchestrator, allocation of application resources of the VM to each of the one or more software applications comprises modifying, with one of the hypervisor or the orchestrator, settings of the running mode of the host computing system.

11. The method of claim 1, wherein modifying, with one of the hypervisor or the orchestrator, allocation of application resources of the VM to each of the one or more software applications, based on a determination that application resource utilization has changed, comprises performing at least one of increasing, with one of the hypervisor or the orchestrator, allocation of application resources of the VM to a first set of the one or more software applications or decreasing, with one of the hypervisor or the orchestrator, allocation of application resources of the VM to a second set of the one or more software applications, based on a determination that application resource utilization is approaching maximum resource use.

12. A system for implementing a virtualization congestion control framework, comprising:

a host computing system connected to a service provider network, said host computing system comprising one or more processors, one or more hardware components, and a non-transitory computer readable medium having encoded thereon a set of instructions that, when executed by the one or more processors, causes the one or more hardware components to perform one or more operations, the set of instructions comprising:

instructions to assign application resources of a virtual machine ("VM"), which is operating on the host computing system, with maximum allowable settings to each of one or more software applications to be executed on the VM;

instructions to determine a running mode of the host computing system, wherein the running mode of the host computing system is based in part on a first level of utilization of the hardware components of the host computing system and based in part on a second level of utilization of emergency reserve components, wherein the emergency reserve components are set aside for at least one of emergency applications or government applications;

based on a determination of the running mode associated with the level of utilization of hardware components of the host computing system, instructions to execute operation of the one or more software applications on the VM using running mode attributes of the determined running mode of the host computing system;

instructions to establish a buffer utilization feedback between the VM and the one or more software applications, wherein the buffer utilization feedback allows the one or more software applications to push back against modification of hardware resource usage;

instructions to monitor application resource utilization of the host computing system; and instructions to, based on a determination that application resource utilization has changed, modify allocation of application resources of the VM to each of the one or more software applications.

13. The system of claim 12, wherein the running mode is selected from a group consisting of a normal running mode ("L0 mode"), a first level crisis mode ("L1 mode"), a second level crisis mode ("L2 mode"), and a third level crisis mode ("L3 mode"), wherein the second level crisis mode defines a smaller minimum resource allocation level compared with the first level crisis mode and the third level crisis mode defines a smaller minimum resource allocation level compared with the second level crisis mode.

14. The system of claim 13, wherein each of the first through third level crisis modes further defines predetermined running mode attributes, wherein the predetermined running mode attributes of the L1 mode include dumping non-essential software applications, the predetermined running mode attributes of the L2 mode include staging workload reductions of remaining software applications, and the predetermined running mode attributes of the L3 mode include slowing processing of the remaining software applications.

15. The system of claim 13, wherein the set of instructions further comprises:
instructions to monitor the host computing system and one or more networks, through which the host computing system is communicatively coupled to other computing systems, for presence of mass congestion indicators;
instructions to, based on a determination that at least one mass congestion indicator is present, modify the running mode of the host computing system; and
instructions to execute the one or more software applications on the VM using running mode attributes of the modified running mode of the host computing system.

16. The system of claim 15, wherein the at least one mass congestion indicator corresponds to one of the L1 mode, L2 mode, or L3 mode.

17. The system of claim 13, wherein the set of instructions further comprises:
instructions to, based on a determination that application resource utilization has changed and based on a determination that the host computing system is in the L0 mode, restrict allocation of additional resources to each of the operating system and the one or more software applications.

18. The system of claim 12, wherein the set of instructions further comprises:
instructions to determine whether the running mode of the host computing system has changed, based on the monitored application resource utilization of the host computing system,
wherein the instructions to modify allocation of application resources of the VM to each of the one or more software applications comprises instructions to modify settings of the running mode of the host computing system.

19. The system of claim 12, wherein the instructions to modify allocation of application resources of the VM to each of the one or more software applications, based on a determination that application resource utilization has changed, comprises instructions to perform at least one of increasing allocation of application resources of the VM to a first set of the one or more software applications or decreasing allocation of application resources of the VM to a second set of the one or more software applications, based on a determination that application resource utilization is approaching maximum resource use.

20. An apparatus comprising a non-transitory computer readable medium having encoded thereon software for controlling operation of a host computing system, the software comprising a set of instructions that, when executed by one or more processors of the host computing system, causes the host computing system to perform one or more operations, the set of instructions comprising:
instructions to assign application resources of a virtual machine ("VM"), which is operating on the host computing system, with maximum allowable settings to each of one or more software applications to be executed on the VM;
instructions to determine a running mode of the host computing system, wherein the running mode of the host computing system is based in part on a first level of utilization of the hardware components of the host computing system and based in part on a second level of utilization of emergency reserve components, wherein the emergency reserve components are set aside for at least one of emergency applications or government applications;
based on a determination of the running mode associated with the level of utilization of hardware components of the host computing system, instructions to execute operation of the one or more software applications on the VM using running mode attributes of the determined running mode of the host computing system;
instructions to establish a buffer utilization feedback between the VM and the one or more software applications, wherein the buffer utilization feedback allows the one or more software applications to push back against modification of hardware resource usage;
instructions to monitor application resource utilization of the host computing system; and instructions to, based on a determination that application resource utilization has changed, modify allocation of application resources of the VM to each of the one or more software applications.

* * * * *